US012786943B2

(12) United States Patent

Ren et al.

(10) Patent No.: US 12,786,943 B2
(45) Date of Patent: Nov. 3, 2026

(54) METHOD FOR POSITIONING TERMINAL, TERMINAL, BASE STATION AND LMF

(71) Applicant: DATANG MOBILE COMMUNICATIONS EQUIPMENT CO., LTD., Beijing (CN)

(72) Inventors: Bin Ren, Beijing (CN); Ren Da, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 119 days.

(21) Appl. No.: 18/860,628

(22) PCT Filed: Apr. 19, 2023

(86) PCT No.: PCT/CN2023/089168
§ 371 (c)(1),
(2) Date: Oct. 26, 2024

(87) PCT Pub. No.: WO2023/207696
PCT Pub. Date: Nov. 2, 2023

(65) Prior Publication Data
US 2025/0294500 A1 Sep. 18, 2025

(30) Foreign Application Priority Data
Apr. 27, 2022 (CN) ........................ 202210459542.X

(51) Int. Cl.
*H04W 24/00* (2009.01)
*H04L 5/00* (2006.01)
(Continued)

(52) U.S. Cl.
CPC .......... *H04W 64/00* (2013.01); *H04L 5/0051* (2013.01); *H04W 8/22* (2013.01)

(58) Field of Classification Search
CPC ........ H04W 64/00; H04W 8/22; H04L 5/0051
(Continued)

(56) References Cited

U.S. PATENT DOCUMENTS

2021/0068092 A1 3/2021 Abedini et al.
2021/0112521 A1 * 4/2021 Dwivedi ............... H04W 64/00
(Continued)

FOREIGN PATENT DOCUMENTS

CN 102045839 A 5/2011
CN 102668492 A 9/2012
(Continued)

OTHER PUBLICATIONS

State Intellectual Property Office of the People's Republic of China, International Search Report issued in Application No. PCT/CN2023/089168, Aug. 4, 2023, 5 pages.
(Continued)

*Primary Examiner* — Temica M Beamer
(74) *Attorney, Agent, or Firm* — KILPATRICK TOWNSEND & STOCKTON LLP

(57) ABSTRACT

The present disclosure provides a method for positioning a terminal, a terminal, a base station and an LMF and relates to the field of wireless communications. The terminal performs ATA and/or AFA according to notification signaling transmitted by a network-side device, and the notification signaling includes indication information for indicating the terminal to perform the ATA and/or AFA; and transmits time information of the ATA and/or AFA performed by the terminal, and the time information of the ATA and/or AFA is used to determine a position of the terminal. By adopting the above method, the LMF may determine the position of the terminal according to each positioning measurement obtained within a time range between two adjacent ATA
(Continued)

and/or AFA performed by the terminal, so the accuracy of positioning the terminal is improved.

20 Claims, 8 Drawing Sheets

(51) Int. Cl.
*H04W 8/22* (2009.01)
*H04W 64/00* (2009.01)

(58) Field of Classification Search
USPC ........................................................ 455/456.1
See application file for complete search history.

(56) References Cited

U.S. PATENT DOCUMENTS

| | | | | |
|---|---|---|---|---|
| 2021/0377906 | A1* | 12/2021 | Bao ........................ | G01S 5/0205 |
| 2021/0400626 | A1* | 12/2021 | Yerramalli ............ | H04W 64/00 |
| 2022/0046566 | A1 | 2/2022 | Leng et al. | |

FOREIGN PATENT DOCUMENTS

| | | | |
|---|---|---|---|
| CN | 110113122 | A | 8/2019 |
| CN | 112838916 | A | 5/2021 |
| CN | 113141648 | A | 7/2021 |
| CN | 114258714 | A | 3/2022 |
| DE | 102021112407 | A1 | 12/2021 |
| EP | 3973322 | A1 | 3/2022 |
| JP | 2006229285 | A | 8/2006 |
| WO | 2021071570 | A1 | 4/2021 |
| WO | 2021205283 | A1 | 10/2021 |
| WO | 2022069184 | A1 | 4/2022 |

OTHER PUBLICATIONS

Office Action of Corresponding EP Patent Application No. 23795129.8 Dated Jul. 23, 2025.

CATT: "Discussion on improved accuracy based on NR carrier phase measurement", 3GPP Draft; R1-2203469, 3rd Generation Partnership Project (3GPP), Mobile Competence Centre ; 650, Route Des Lucioles ; F-06921 Sophia-Antipolis Cedex; France, vol. RAN WG1, No. e-Meeting; May 9, 2022-May 20, 2022.

Office Action of Corresponding JP Patent Application No. 2024-563394 Mailed Sep. 30, 2025.

The first office action and search report issued in Chinese corresponding application 202210459542.X, mailed on Jul. 16, 2026.

Moderator (CATT), "FL Summary for improved accuracy based on NR carrier phase measurement", 3GPP TSG RAN WG1 Meeting #109e, e-meeting, May 9-20, 2022, total 56 pages, R1-2205164.

The office action and search report issued in Indian corresponding application 202417087150, mailed on Aug. 27, 2026.

* cited by examiner

METHOD FOR POSITIONING TERMINAL, TERMINAL, BASE STATION AND LMF

CROSS-REFERENCE TO RELATED APPLICATIONS

The present disclosure is a national stage of the PCT application No. PCT/CN2023/089168, which claims priority to Chinese Patent Application No. 202210459542.X, filed to the China Patent Office on Apr. 27, 2022 and entitled "METHOD FOR POSITIONING TERMINAL, TERMINAL, BASE STATION AND LMF", the entire content of which is incorporated herein by reference.

FIELD

The present disclosure relates to the field of wireless communications, in particular to, a method for positioning a terminal, a terminal, a base station and an LMF.

BACKGROUND

At present, in a 5G positioning system, a crystal oscillator adopted by a 5G base station, and a terminal has a frequency deviation, so the terminal will perform autonomous time adjustment (ATA) and autonomous frequency adjustment (AFA) operations by default. In a 5G sidelink (SL) positioning system, Vehicle to Everything-UE (V2X-UE) may adjust receiving timing and transmitting timing based on a received synchronization signal/PBCH block (SSB), or when a scene within coverage is switched to a scene beyond coverage, the V2X-UE may also perform ATA and/or AFA by default.

In downlink-time difference of arrival (DL-TDOA), uplink-time difference of arrival (UL-TDOA) or multiple cell-round trip time (Multi-RTT) positioning methods, the ATA and AFA operations by the terminal will affect accuracy of positioning the terminal.

SUMMARY

Embodiments of the present disclosure provide a method for positioning a terminal, a terminal, a base station and an LMF, which may cause a location management function (LMF) to perform joint processing on a positioning measurement based on time information of ATA and/or AFA, to improve accuracy of positioning the terminal.

Embodiments of the present disclosure provide a method for positioning a terminal, applied to a terminal and including:

- performing ATA and/or AFA according to notification signaling transmitted by a network-side device; and the notification signaling includes indication information for indicating the terminal to perform the ATA and/or AFA; and
- transmitting time information of the ATA and/or AFA performed by the terminal; and the time information of the ATA and/or AFA is used to determine a position of the terminal.

According to the method for positioning the terminal provided by the embodiments of the present disclosure, the terminal performs the ATA and/or AFA according to the notification signaling transmitted by the network-side device and transmits the time information of performing the ATA and/or AFA to the LMF, and by the above method, the LMF may determine the position of the terminal according to each positioning measurement obtained within a time range between two adjacent ATA and/or AFA performed by the terminal, to improve the accuracy of positioning the terminal.

In some embodiments, before performing the ATA and/or AFA according to the notification signaling transmitted by the network-side device, the method further includes:

- transmitting a report to the network-side device that the terminal supports performing the ATA and/or AFA within a valid adjustment window (VAW), and receiving the notification signaling transmitted by the network-side device; or
- transmitting a report to the network-side device that the terminal supports performing the ATA and/or AFA according to a predefined rule, and receiving the notification signaling transmitted by the network-side device.

In some embodiments, the indication information included in the notification signaling includes a VAW configuration parameter; and performing the ATA and/or AFA according to the notification signaling transmitted by the network-side device includes:

- based on that the time range of a VAW indicated by the VAW configuration parameter does not coincide with a signal processing time range, performing the ATA and/or AFA within a time range of the VAW; and the signal processing time range refers to a time range of processing a positioning reference signal.

In some embodiments, the indication information included in the notification signaling further includes a priority type parameter; the priority type parameter is used to indicate a priority relationship between the VAW and the positioning reference signal; and performing the ATA and/or AFA according to the notification signaling transmitted by the network-side device further includes:

- based on that the time range of the VAW indicated by the VAW configuration parameter coincides partially or completely with the signal processing time range, performing the ATA and/or AFA within the time range of VAW according to the priority relationship between the VAW and the positioning reference signal.

In some embodiments, performing the ATA and/or AFA within the time range of VAW according to the priority relationship between the VAW and the positioning reference signal includes:

- based on that a priority of the VAW is higher than a priority of the positioning reference signal, performing the ATA and/or AFA at a first moment, and the first moment is any moment within the time range of VAW; and
- based on that the priority of the VAW is lower than the priority of the positioning reference signal, performing the ATA and/or AFA at any moment within the time range of VAW except a second moment, and the second moment is a moment of processing the positioning reference signal by the terminal.

In some embodiments, the indication information included in the notification signaling includes the predefined rule; the predefined rule indicates that the terminal does not to perform the ATA and/or AFA within a signal processing time range and performs the ATA and/or AFA after the positioning reference signal is processed; and the signal processing time range refers to a time range of processing the positioning reference signal.

In some embodiments, the positioning reference signal is a downlink positioning reference signal (DL PRS), and the signal processing time range is a time range of a measurement gap (MG) or a downlink positioning reference signal processing window (PRS processing window (PPW)) determined according to a resource configuration parameter of the DL PRS transmitted by an LMF; processing the positioning reference signal refers to receiving the DL PRS transmitted by a base station and performing a measurement; or the positioning reference signal is an uplink sounding reference signal for positioning (UL SRS-Pos), the signal processing time range is determined according to a resource configuration parameter of the UL SRS-Pos transmitted by the base station; processing the positioning reference signal refers to transmitting the UL SRS-Pos to the base station; or the positioning reference signal is a sidelink positioning reference signal (SL PRS), the terminal is a receiving terminal, and the signal processing time range is determined according to a time range of an MG or a PPW indicated in a resource configuration parameter of the SL PRS transmitted by the LMF; processing the positioning reference signal refers to receiving the SL PRS transmitted by a transmitting terminal and performing a measurement; or the positioning reference signal is the SL PRS, the terminal is the transmitting terminal, and the signal processing time range is determined according to a resource configuration parameter of the SL PRS transmitted by the base station; and processing the positioning reference signal refers to transmitting the SL PRS to a receiving terminal.

In some embodiments, the notification signaling is LTE positioning protocol (LPP) signaling transmitted by the LMF; or the notification signaling is radio resource control (RRC) signaling, media access control-control element (MAC CE) signaling or downlink control information (DCI) signaling transmitted by the base station.

Embodiments of the present disclosure provide a method for positioning a terminal, applied to a base station and including:

receiving a terminal capability report transmitted by a first terminal; and the terminal capability report represents that the first terminal supports performing ATA and/or AFA within a valid adjustment window (VAW) or supports performing the ATA and/or AFA according to a predefined rule; and transmitting notification signaling; and the notification signaling is used to indicate the first terminal to perform the ATA and/or AFA.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; the positioning reference signal is a downlink positioning reference signal (DL PRS), an uplink sounding reference signal for positioning (UL SRS-Pos) or a sidelink positioning reference signal (SL PRS); and the signal processing time range refers to a time range of processing the positioning reference signal.

In some embodiments, the base station includes a serving base station and a neighbor base station.

In some embodiments, the notification signaling is radio resource control (RRC) signaling, media access control-control element (MAC CE) signaling or downlink control information (DCI) signaling.

Embodiments of the present disclosure provide a method for positioning a terminal, applied to a location management function (LMF) and including:

receiving time information of ATA and/or AFA performed by the first terminal transmitted by the first terminal; and determining a position of the first terminal based on the time information of the ATA and/or AFA.

In some embodiments, determining the position of the first terminal based on the time information of the ATA and/or AFA includes:

determining a time range between two adjacent ATA and/or AFA performed by the first terminal based on the time information of the ATA and/or AFA; and determining the position of the first terminal according to various positioning measurements of the first terminal obtained within the time range; and the positioning measurements are obtained by measuring a positioning reference signal corresponding to the first terminal.

In some embodiments, before receiving the time information of the ATA and/or AFA performed by the first terminal transmitted by the first terminal, the method further includes:

receiving a terminal capability report transmitted by the first terminal; and the terminal capability report represents that the first terminal supports performing the ATA and/or AFA within a valid adjustment window (VAW) or supports performing the ATA and/or AFA according to a predefined rule; and transmitting notification signaling; and the notification signaling is used to indicate the first terminal to perform the ATA and/or AFA.

In some embodiments, the notification signaling is LPP signaling.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; and the signal processing time range refers to a time range of processing the positioning reference signal.

In some embodiments, the positioning reference signal is a downlink positioning reference signal (DL PRS), the positioning measurements are a reference signal time difference (RSTD), a time difference between transmitting and receiving of the terminal, a downlink phase of arrival (which means that a phase of arrival (POA)), or a downlink phase difference of arrival (PDOA) transmitted by the first terminal; or the positioning reference signal is an uplink sounding reference signal for positioning (UL SRS-Pos), and the positioning measurement is an uplink relative time of arrival (RTOA), a time difference between transmitting and receiving of a base station, an uplink POA, or an uplink PDOA transmitted by a base station; or the positioning reference signal is a sidelink positioning reference signal (SL PRS), the first terminal is a receiving terminal, and the positioning measurement is a time difference of arrival (TDOA), a time difference between transmitting and receiving of the receiving terminal, an SL POA, or an SL PDOA transmitted by the first terminal; or the positioning reference signal is the SL PRS, the first terminal is a transmitting terminal, and the positioning measurement is a time difference between transmitting and receiving of the first terminal.

In some embodiments, based on that the positioning reference signal is the DL PRS, the method further includes:

receiving a positioning measurement and quality information of the positioning measurement obtained by measuring the DL PRS and transmitted by the first terminal.

In some embodiments, based on that the positioning reference signal is the SL PRS and the first terminal is the receiving terminal, the method further includes:

receiving a positioning measurement and quality information of the positioning measurement obtained by measuring the SL PRS and transmitted by the first terminal.

In some embodiments, the quality information includes a signal-to-noise ratio (SNR), a signal-to-interference and noise ratio (SINR) or a variance of a measurement error.

Embodiments of the present disclosure provide a terminal, including:

an adjusting unit, configured to perform ATA and/or AFA according to notification signaling transmitted by a network-side device; and the notification signaling includes indication information for indicating the terminal to perform the ATA and/or AFA; and a first transmitting unit, configured to transmit time information of the ATA and/or AFA performed by the terminal; and the time information of the ATA and/or AFA is used to determine a position of the terminal.

Embodiments of the present disclosure provide a base station, including:

a first receiving unit, configured to receive a terminal capability report transmitted by a first terminal; and the terminal capability report represents that the first terminal supports performing ATA and/or AFA within a valid adjustment window (VAW) or supports performing the ATA and/or AFA according to a predefined rule; and a second transmitting unit, configured to transmit notification signaling; and the notification signaling is used to indicate the first terminal to perform the ATA and/or AFA.

Embodiments of the present disclosure provide a location management function (LMF), including:

a second receiving unit, configured to receive time information of ATA and/or AFA performed by the first terminal transmitted by the first terminal; and a determining unit, configured to determine a position of the first terminal based on the time information of the ATA and/or AFA.

Embodiments of the present disclosure provide a terminal, including: a memory, a transceiver and a processor;

the memory is configured to store computer instructions;

the transceiver is configured to transceive data under control of the processor; and the processor is configured to read a computer program in the memory and perform the following steps:

performing ATA and/or AFA according to notification signaling transmitted by a network-side device; and the notification signaling includes indication information for indicating the terminal to perform the ATA and/or AFA; and controlling the transceiver to transmit time information of the ATA and/or AFA performed by the terminal; and the time information of the ATA and/or AFA is used to determine a position of the terminal.

In some embodiments, the transceiver may further be configured to:

transmit a report that the terminal supports performing the ATA and/or AFA within a valid adjustment window (VAW) to the network-side device, and receive the notification signaling transmitted by the network-side device; or transmit a report to the network-side device that the terminal supports performing the ATA and/or AFA according to a predefined rule, and receive the notification signaling transmitted by the network-side device.

In some embodiments, the indication information included in the notification signaling includes a VAW configuration parameter; and the processor is configured to:

based on that the time range of a VAW indicated by the VAW configuration parameter does not coincide with a signal processing time range, perform the ATA and/or AFA within a time range of the VAW; and the signal processing time range refers to a time range of processing a positioning reference signal.

In some embodiments, the indication information included in the notification signaling further includes a priority type parameter; the priority type parameter is used to indicate a priority relationship between the VAW and the positioning reference signal; and the processor may further be configured to:

perform the ATA and/or AFA within the time range of VAW according to the priority relationship between the VAW and the positioning reference signal based on that the time range of the VAW indicated by the VAW configuration parameter coincides partially or completely with the signal processing time range.

In some embodiments, the processor is configured to:

perform the ATA and/or AFA at a first moment based on that a priority of the VAW is higher than a priority of the positioning reference signal, and the first moment is any moment within the time range of VAW, and a positioning reference signal of the first moment is discarded; and perform the ATA and/or AFA at any moment within the time range of VAW except a second moment based on that the priority of the VAW is lower than the priority of the positioning reference signal, and the second moment is a moment of processing the positioning reference signal by the terminal.

In some embodiments, the indication information included in the notification signaling includes the predefined rule; the predefined rule indicates that the terminal does not perform the ATA and/or AFA within a signal processing time range and performs the ATA and/or AFA after the positioning reference signal is processed; and the signal processing time range refers to a time range of processing the positioning reference signal.

In some embodiments, the positioning reference signal is a downlink positioning reference signal (DL PRS), and the signal processing time range is a time range of a measurement gap (MG) or a downlink positioning reference signal processing window (PPW) determined according to a resource configuration parameter of the DL PRS transmitted by an LMF; processing the positioning reference signal refers to receiving the DL PRS transmitted by a base station and performing a measurement; or the positioning reference signal is an uplink sounding reference signal for positioning (UL SRS-Pos), and the signal processing time range is determined according to a resource configuration parameter of the UL SRS-Pos transmitted by the base station; processing the positioning reference signal refers to transmitting the UL SRS-Pos to the base station; or the positioning reference signal is a sidelink positioning reference signal (SL PRS), the terminal is a receiving terminal, the signal processing time range is determined according to a time range of an MG or a PPW indicated in a resource configuration parameter of the SL PRS transmitted by the LMF; processing the positioning reference signal refers to receiving the SL PRS transmitted by a transmitting terminal and performing a measurement; or the positioning reference signal is the SL PRS, the terminal is the transmitting terminal, and the signal processing time range is determined according to a resource configuration parameter of the SL PRS transmitted by the base station; and processing the positioning reference signal refers to transmitting the SL PRS to the receiving terminal.

In some embodiments, the notification signaling is long-term-evolution positioning protocol (LPP) signaling transmitted by an LMF; or the notification signaling is radio resource control (RRC) signaling, media access control-control element (MAC CE) signaling or downlink control information (DCI) signaling transmitted by a base station.

Embodiments of the present disclosure provide a base station, including: a memory, a transceiver and a processor;

the memory is configured to store computer instructions;

the transceiver is configured to receive a terminal capability report transmitted by a first terminal under control of the processor; and the terminal capability report represents that the first terminal supports performing ATA and/or AFA within a valid adjustment window (VAW) or supports performing the ATA and/or AFA according to a predefined rule; and transmit notification signaling; and the notification signaling is used to indicate the first terminal to perform the ATA and/or AFA.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; the positioning reference signal is a downlink positioning reference signal (DL PRS), an uplink sounding reference signal for positioning (UL SRS-Pos) or a sidelink positioning reference signal (SL PRS); and the signal processing time range refers to a time range of processing the positioning reference signal.

In some embodiments, the base station includes a serving base station and a neighbor base station.

In some embodiments, the notification signaling is radio resource control (RRC) signaling, media access control-control element (MAC CE) signaling or downlink control information (DCI) signaling.

Embodiments of the present disclosure provide a location management function (LMF), including: a memory, a transceiver and a processor;

the memory is configured to store computer instructions;

the transceiver is configured to transceive data under control of the processor; and the processor is configured to read a computer program in the memory and perform:

controlling the transceiver to receive time information of ATA and/or AFA performed by the first terminal transmitted by the first terminal; and determining a position of the first terminal based on the time information of the ATA and/or AFA.

In some embodiments, the processor is configured to:

determine a time range between two adjacent ATA and/or AFA performed by the first terminal based on the time information of the ATA and/or AFA; and determine the position of the first terminal according to various positioning measurements of the first terminal obtained within the time range; and the positioning measurements are obtained by measuring a positioning reference signal corresponding to the first terminal.

In some embodiments, the transceiver may further be configured to:

receive a terminal capability report transmitted by the first terminal; and the terminal capability report represents that the first terminal supports performing the ATA and/or AFA within a valid adjustment window (VAW) or supports performing the ATA and/or AFA according to a predefined rule; and transmit notification signaling; and the notification signaling is used to indicate the first terminal to perform the ATA and/or AFA.

In some embodiments, the notification signaling is long-term-evolution positioning protocol (LPP) signaling.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; and the signal processing time range refers to a time range of processing the positioning reference signal.

In some embodiments, the positioning reference signal is a downlink positioning reference signal (DL PRS), the positioning measurements are a reference signal time difference (RSTD), a time difference between transmitting and receiving of the terminal, a downlink phase of arrival (POA) value, or a downlink phase difference of arrival (PDOA) transmitted by the first terminal; or the positioning reference signal is an uplink sounding reference signal for positioning (UL SRS-Pos), and the positioning measurement is an uplink relative time of arrival (RTOA), a time difference between transmitting and receiving of a base station, an uplink POA, or an uplink PDOA transmitted by a base station; or the positioning reference signal is a sidelink positioning reference signal (SL PRS), the first terminal is a receiving terminal, and the positioning measurement is a time difference of arrival (TDOA), a time difference between transmitting and receiving of the receiving terminal, an SL POA, or an SL PDOA transmitted by the first terminal; or the positioning reference signal is the SL PRS, the first terminal is a transmitting terminal, and the positioning measurement is a time difference between transmitting and receiving of the first terminal.

In some embodiments, based on that the positioning reference signal is the DL PRS, the transceiver is further configured to:

receive a positioning measurement and quality information of the positioning measurement obtained by measuring the DL PRS and transmitted by the first terminal.

In some embodiments, based on that the positioning reference signal is the SL PRS and the first terminal is the receiving terminal, the transceiver is further configured to:

receive a positioning measurement and quality information of the positioning measurement obtained by measuring the SL PRS and transmitted by the first terminal.

In some embodiments, the quality information includes a signal-to-noise ratio (SNR), a signal-to-interference and noise ratio (SINR) or a variance of a measurement error.

Embodiments of the present disclosure provide a system for positioning a terminal, including a terminal, a base station and a location management function (LMF); and the terminal is any terminal in the embodiments, the base station is any base station in the embodiments, and the LMF is the LMF in the embodiments.

Embodiments of the present disclosure provide a computer-readable storage medium, storing computer instructions, and the computer instructions, when performed by a processor, implement any method in the embodiments.

Effects brought by any implementation in the second aspect to the eleventh aspect may refer to effects brought by the implementation in the embodiments, which are not described in detail here.

BRIEF DESCRIPTION OF DRAWINGS

In order to more clearly describe the embodiments of the present disclosure, the accompanying drawings needed by the description in the embodiments will be briefly introduced below. The accompanying drawings in the following description are only some embodiments of the present disclosure.

DETAILED DESCRIPTION

Specific implementations of the present disclosure are described in detail below with reference to accompanying drawings. It is to be understood that specific implementations described here are merely for describing and explaining the present disclosure instead of limiting the present disclosure.

It is to be noted that "first" and "second" in the embodiments of the present disclosure are used to distinguish similar objects, but are not used to describe a specific sequence or sequential order. "And/or" in the embodiments of the present disclosure describes an association relationship between associated objects and represents that there may be three relationships, for example, A and/or B, which represents that merely A exists, both A and B exist, and merely B exists. A character "/" generally represents an "or" relationship between associated objects before and after the character.

A network architecture and a service scene described in the embodiments of the present disclosure are intended to describe the embodiments of the present disclosure more clearly but do not constitute a limitation on the embodiments of the present disclosure, and with evolution of a network architecture and emergence of a new service scene, the embodiments of the present disclosure are also applicable to similar problems.

At present, in a 5G positioning system, a crystal oscillator adopted by a 5G base station and a terminal has a frequency deviation, so the terminal will perform ATA and AFA operations by default. In a 5G sidelink (SL) positioning system, V2X-UE may adjust receiving timing and transmitting timing based on a received SSB, or when a scene within coverage is switched to a scene beyond coverage, the V2X-UE may also perform the ATA and/or AFA by default.

In a DL-TDOA, UL-TDOA or Multi-RTT positioning method, the ATA and AFA operations by the terminal will affect the accuracy of positioning the terminal.

Based on this, embodiments of the present disclosure provides a method for positioning a terminal, a terminal, a base station and an LMF. The method for positioning the terminal includes: the terminal performs ATA and/or AFA according to notification signaling transmitted by a network-side device, and the notification signaling includes indication information for indicating the terminal to perform the ATA and/or AFA; and the terminal transmits time information of the ATA and/or AFA performed by the terminal to the LMF. The LMF may determine a position of the terminal according to each positioning measurement obtained within a time range between two adjacent ATA and/or AFA performed by the terminal through the above method, to improve the accuracy of positioning the terminal.

Figure 1:
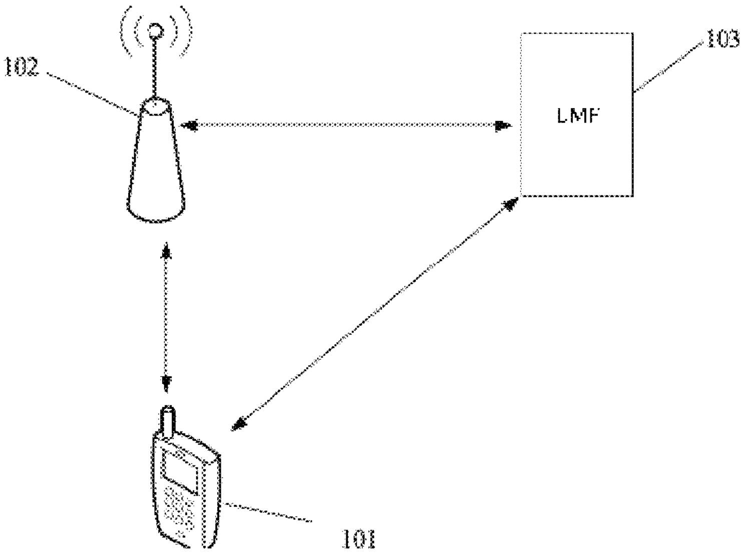
FIG. 1 is a diagram of an application scene of a method for positioning a terminal suitable for the embodiments of the present disclosure.

FIG. 1 is a schematic structural diagram of a system for positioning a terminal suitable for the embodiments of the present disclosure. The embodiments of the present disclosure are applied to the system for positioning the terminal. The system for positioning the terminal at least includes a terminal 101, a base station 102 and an LMF 103. The base station 102 may be a serving base station for providing a service for the terminal 101, or may also be a neighbor base station with a distance away from the terminal 101 is less than a distance threshold, and the distance threshold may be 50 meters, or 100 meters, which is not limited by the present disclosure.

In an embodiment, the base station 102 or the LMF 103 may transmit notification signaling to the terminal 101, and the notification signaling includes indication information for indicating the terminal 101 to perform ATA and/or AFA; the terminal 101 may perform the ATA and/or AFA operations according to the notification signaling after receiving the notification signaling and transmit time information of performing the ATA and/or AFA to the LMF 103; and the LMF 103 may determine the position of the terminal according to each positioning measurement obtained within a time range between two adjacent ATA and/or AFA performed by the terminal 101.

The method for positioning the terminal provided by the present disclosure includes a downlink positioning method, an uplink positioning method and a sidelink positioning method, and different positioning methods will be respectively described in detail below through specific embodiments.

Figure 2:
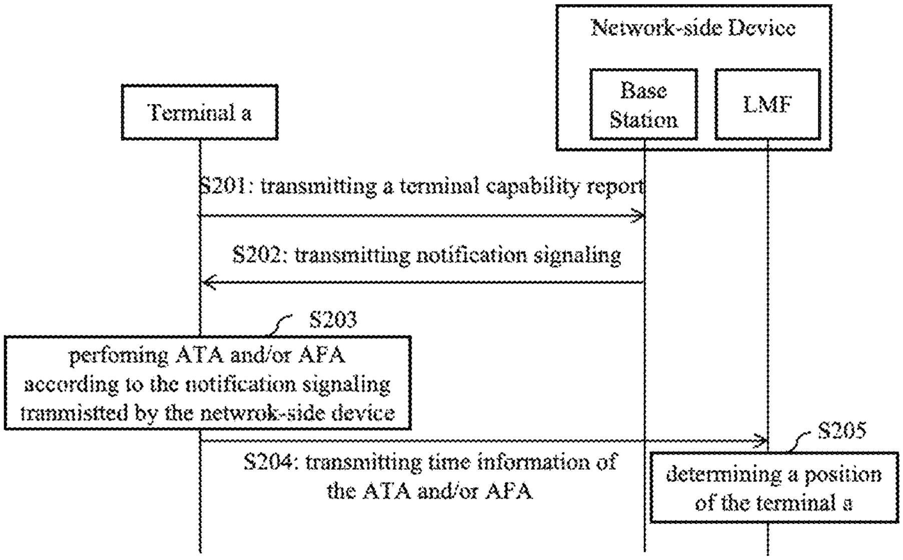
FIG. 2 is a schematic flowchart of interaction of a downlink positioning method provided by the embodiments of the present disclosure.

FIG. 2 shows a flowchart of interaction of a downlink positioning method provided by the embodiments of the present disclosure. The downlink positioning method is suitable for downlink positioning or Multi-RTT positioning. As shown in FIG. 2, the method is described by taking a network-side device and a terminal a as an example, and the terminal a represents any terminal. Specifically, the method includes the following steps.

Step S201: the terminal a transmits a terminal capability report to the network-side device.

The network-side device may be a base station or an LMF, the base station may be a serving base station for providing a service for the terminal a, or a neighbor base station of the terminal a. The LMF may be an LMF connected with the terminal a or the base station.

The terminal capability report may be used to represent that the terminal a support is performing ATA and/or AFA within a VAW; or the terminal capability report may also be used to represent that the terminal a supports performing the ATA and/or AFA according to a predefined rule.

Step S202: the network-side device transmits notification signaling to the terminal a.

In an embodiment, when the network-side device is the base station, the notification signaling may be RRC signaling, MAC CE signaling or DCI signaling transmitted by the base station; and when the network-side device is LMF, the notification signaling may be LPP signaling transmitted by the LMF.

The notification signaling includes indication information for indicating the terminal a to perform the ATA and/or AFA. The indication information may include a VAW configuration parameter and a priority type parameter, and the priority type parameter is used to indicate a priority relationship between the VAW and a DL PRS. The indication information may also include the predefined rule, and the predefined rule is used to indicate that the terminal a does not perform the ATA and/or AFA within a signal processing time range and performs the ATA and/or AFA after a positioning reference signal is processed. The signal processing time range refers to a time range of processing the positioning reference signal.

Step S203: the terminal a performs the ATA and/or AFA according to the notification signaling transmitted by the network-side device.

In one embodiment, before the terminal a performs the ATA and/or AFA according to the notification signaling transmitted by the network-side device, the terminal a may also receive a resource configuration parameter of the DL PRS transmitted by the LMF and determine a time range of an MG or a PPW according to the resource configuration parameter of the DL PRS. The terminal a may receive the DL PRS transmitted by the base station within the time range and measure the DL PRS to obtain a downlink positioning measurement.

In an embodiment, it is assumed that the notification signaling includes the VAW configuration parameter and the priority type parameter for indicating the terminal a to perform the ATA and/or AFA, and after the terminal a receives the notification signaling, the terminal a may compare a time range of the VAW indicated by the VAW configuration parameter with the time range of the MG or the PPW determined according to the resource configuration parameter of the DL PRS and determine whether the time range of VAW coincides with the time range of the MG or the PPW.

Figure 3:
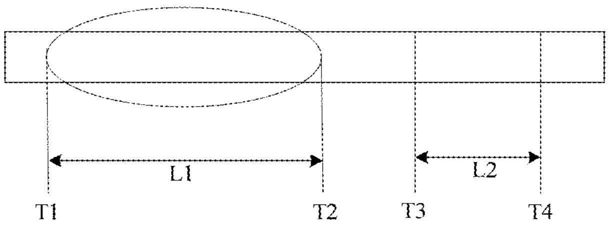
FIG. 3 is a schematic diagram when a time range of the VAW does not coincide with a time range of an MG or a PPW provided by the embodiments of the present disclosure.

Exemplarily, in an embodiment, based on that the time range of VAW does not coincide with the time range of the MG or the PPW, as shown in FIG. 3, L1 is the time range of VAW, T1 is a start moment of the VAW, T2 is an end moment of the VAW, L2 is the time range of the MG or the PPW, T3 is a start moment of the MG or the PPW, T4 is an end moment of the MG or the PPW, the terminal a may perform the ATA and/or AFA within the time range of VAW, which means that the terminal a perform the ATA and/or AFA from the moment T1 to the moment T2; and the terminal a may receive the DL PRS transmitted by the base station within the time range of the MG or the PPW, which means that the terminal a may receive the DL PRS transmitted by the station from the moment T3 to the moment T4, and then measure the DL PRS to obtain the downlink positioning measurement.

In the embodiments of the present disclosure, the downlink positioning measurement may include an RSTD, a time difference between transmitting and receiving of the terminal, a downlink POA or a downlink PDOA.

Figure 4:
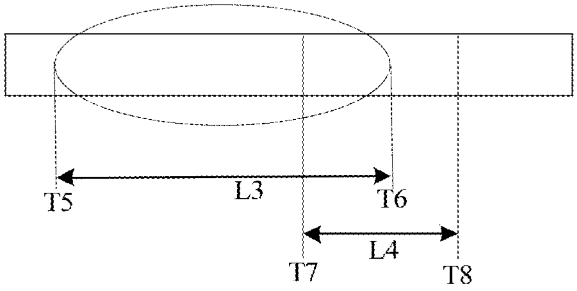
FIG. 4 is a schematic diagram when a time range of the VAW coincides partially with a time range of an MG or a PPW provided by the embodiments of the present disclosure.

In another embodiment, based on that the time range of VAW coincides partially or completely with the time range of the MG or the PPW, as shown in FIG. 4, L3 is the time range of VAW, T5 is a start moment of the VAW, T6 is an end moment of the VAW, L4 is the time range of the MG or the PPW, T7 is a start moment of the MG or the PPW, T8 is an end moment of the MG or the PPW, T5<T7<T6<T8, which means that the time range of VAW coincides partially with the time range of the MG or the PPW, the terminal a may determine the priority relationship between the VAW and the DL PRS according to the priority type parameter and perform the ATA and/or AFA within the time range of VAW according to the priority relationship between the VAW and the DL PRS.

Exemplarily, in an embodiment, based on that a priority of the VAW is higher than a priority of the DL PRS, the terminal a may select any moment within the time range of VAW as a first moment and perform the ATA and/or AFA at the first moment; and if the terminal a receives the DL PRS transmitted by the base station at the first moment, which means that the ATA and/or AFA performed by the terminal collides with the moment of processing the DL PRS and/or orthogonal frequency division multiplexing (OFDM) symbols, the terminal a may discard the DL PRS received at the first moment, which mean that the terminal a may use the DL PRS as an invalid signal. If the ATA and/or AFA performed by the terminal a does not collides with the moment of processing the DL PRS and/or the OFDM symbols, the DL PRS is a valid signal, which means that the terminal a may measure the received DL PRS to obtain the downlink positioning measurement.

In another embodiment, based on that the priority of the VAW is lower than the priority of the DL PRS, it is assumed that the terminal a receives the DL PRS transmitted by the base station at the second moment within the time range of the MG or the PPW, and may measure the DL PRS to obtain the downlink positioning measurement, and the second moment is any moment within the time range of the MG or the PPW. The terminal a may perform the ATA and/or AFA at any moment within the time range of VAW except the second moment. In the embodiments of the present disclosure, when there is no moment for performing the ATA and/or AFA within one DL PRS cycle, the cycle is an invalid cycle.

In another embodiment, it is assumed that the notification signaling includes the predefined rule for indicating the terminal a to perform the ATA and/or AFA, the terminal a may measure the received DL PRS transmitted by the base station according to the predefined rule to obtain the downlink positioning measurement after receiving the notification signaling, and then perform the ATA and/or AFA, which means that the terminal a does not perform the ATA and/or AFA within a time range of receiving and measuring the DL PRS transmitted by the base station.

Figure 5:
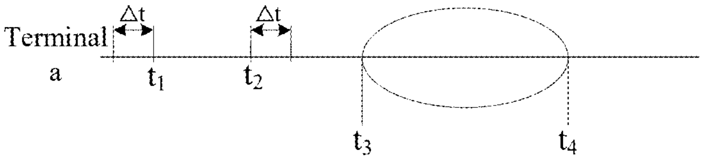
FIG. 5 is a schematic diagram of a relationship between a terminal performing ATA and/or AFA and the terminal calculating a time difference between transmitting and receiving of the terminal in Multi-RTT positioning provided by the embodiments of the present disclosure.

Exemplarily, when the positioning method is Multi-RTT positioning, the terminal a cannot perform the ATA and/or AFA within a time range of the time difference between transmitting and receiving of the terminal computed by the terminal a, which means that the terminal a does not perform the ATA and/or the AFA within a time range of measuring the DL PRS and obtaining the downlink positioning measurement by the terminal a. Exemplarily, as shown in FIG. 5, the terminal a calculates the time range of time difference between receiving and transmitting of the terminal as $[t_1-\Delta t, t_2+\Delta t]$, and $\Delta t$ represents a margin, $t_3$ represents the start moment of the time range of the ATA and/or ATA performed by the terminal a, and $t_3$ represents the end moment of the time range of the ATA and/or ATA performed by the terminal a.

Step S204: the terminal a transmits time information of the ATA and/or AFA to the LMF.

Through the step S203, after the terminal a performs the ATA and/or AFA according to the notification signaling, the terminal a may transmit the indication information and the time information of the ATA and/or ATA performed by the terminal a to the LIMF, and the indication information is used to indicate that the terminal a has performed the ATA and/or AFA.

Step S205: the LMF determines a position of the terminal a.

In an embodiment, before the LMF determines the position of the terminal a, the LMF may also receive the downlink positioning measurement transmitted by the terminal a, and the downlink positioning measurements are transmitted to the LIMF after the terminal a measures the DL PRS transmitted by the base station. The LMF may receive downlink positioning measurements within a time range between two adjacent ATA and/or AFA performed by the terminal a.

In an embodiment, before the LMF determines the position of the terminal a, the LMF may also receive quality information of the downlink positioning measurement transmitted by the terminal a and base station position information transmitted by the base station. The quality information of the downlink positioning measurement may be one or more of an SNR, an SINR or a variance of a measurement error.

Through the above method, the LMF may receive transmitted time information of the ATA and/or AFA sent by the terminal a after each ATA and/or AFA performed by the terminal a and then determine time of two adjacent ATA and/or AFA performed by the terminal. The LMF may determine the position of the terminal a according to the downlink positioning measurement transmitted by the terminal a, the quality information of the downlink positioning measurement transmitted by the terminal a, and position information of each base station associated with the terminal a received within the time range between two adjacent ATA and/or AFA performed by the terminal a.

Specifically, in an embodiment, the LMF may determine a weighted downlink positioning measurement corresponding to a moment $t_k$ according to the downlink positioning measurement and the quality information of the downlink positioning measurement by using a formula 1 and a formula 2. The moment $t_k$ may be any moment within the time range between two adjacent ATA and/or AFA performed by the terminal a.

$$x(k) = f(x_m(k), x_m(k-1), x_m(k-2), \ldots x_m(k-M)) \quad \text{(Formula 1)}$$

$$f(n) = a_0 f_m(n) + a_1 f_m(n-1) + a_2 f_m(n-2) + \cdots + a_{M-1} f_m(n-M+1), \quad \text{(Formula 2)}$$

and represents the weighted downlink positioning measurement at the moment $t_k$, for example: an RSTD and the time difference between transmitting and receiving of the terminal; represents a downlink positioning measurement which is reported at a moment and not weighted, a value of i may be k, k−1, . . . , k−M; is a weighting function which depends on a weighting algorithm; M represents the number of downlink positioning measurements reported within the time range between two adjacent ATA and/or AFA performed by the terminal; and is a weighted parameter, and $$\sum_{i=0}^{M-1} a_i = 1.$$

A weighted parameter may be determined according to different weighted algorithms and/or the quality information of the positioning measurement. For example, when the weighted algorithm is an average value weighting algorithm, the weighted parameter may be $a_0=a_1= \ldots =a_{M-1}=1/M$; or the weighted parameter may be $a_0=1$, $a_1= \ldots =a_{M-1}=0$; or the weighted parameter may be $a_{M-1}=1$, $a_0= \ldots =a_{M-2}=0$; or the weighted parameter may be $a_n=1$, $a_0= \ldots =a_{M-1}=0$, and measurement quality of the downlink positioning measurement corresponding to is the highest.

After the weighted downlink positioning measurement corresponding to each moment within the time range between two adjacent ATA and/or AFA performed by the terminal a is determined, the LMF may determine the position of the terminal a according to the weighted downlink positioning measurement corresponding to each moment and the position information of each base station.

Figure 6:
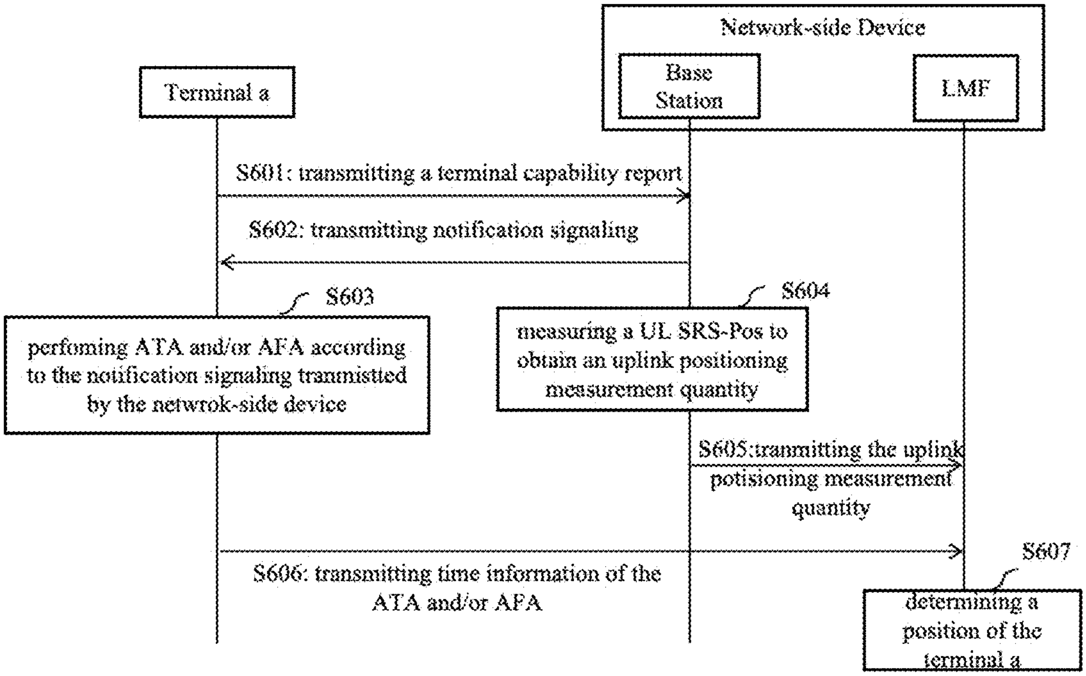
FIG. 6 is a schematic flowchart of interaction of an uplink positioning method provided by the embodiments of the present disclosure.

FIG. 6 shows a flowchart of interaction of an uplink positioning method provided by the embodiments of the present disclosure. The uplink positioning method is suitable for uplink positioning or Multi-RTT positioning. As shown in FIG. 6, the method is described by taking the network-side device and the terminal a as an example and the terminal a represents any terminal.

Specifically, the method includes the following steps.

Step S601: the terminal a transmits the terminal capability report to the network-side device.

Step S602: the network-side device transmits notification signaling to the terminal a.

Step S603: the terminal a performs the ATA and/or AFA according to the notification signaling transmitted by the network-side device.

In one embodiment, before the terminal a performs the ATA and/or AFA according to the notification signaling transmitted by the network-side device, the terminal a may also receive a resource configuration parameter of a UL SRS-Pos transmitted by the base station, and determine a time range of transmitting the UL SRS-Pos to the base station by the terminal a according to the resource configuration parameter of the UL SRS-Pos.

In an embodiment, it is assumed that the notification signaling includes the VAW configuration parameter and the priority type parameter for indicating the terminal a to perform the ATA and/or AFA, and after the terminal a receives the notification signaling, the terminal a may compare a time range of the VAW indicated by the VAW configuration parameter with the time range of transmitting the UL SRS-Pos to the base station by the terminal a determined according to the resource configuration parameter of the UL SRS-Pos and determine whether the time range of VAW coincides with the time range of transmitting the UL SRS-Pos to the base station by the terminal a.

Figure 7:
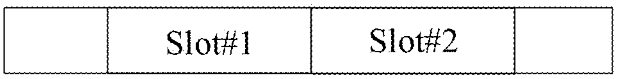
FIG. 7 is a schematic diagram when a time range of the VAW does not coincide with a time range of transmitting, by a terminal, a UL SRS-Pos to a base station provided by the embodiments of the present disclosure.

In an embodiment, based on that the time range of VAW does not coincide with the time range of transmitting the UL SRS-Pos to the base station by the terminal a, as shown in FIG. 7, a slot #1 (slot #1) is the time range of VAW, and a slot #2 (slot #2) is the time range of transmitting the UL SRS-Pos to the base station by the terminal a; the terminal a may perform the ATA and/or AFA within the time range of VAW, which means that perform the ATA and/or AFA within the slot #1; and the UL SRS-Pos may be transmitted to the base station within the time range of transmitting the UL SRS-Pos to the base station by the terminal a, which mean that the UL SRS-Pos may be transmitted to the base station within the slot #2.

In another embodiment, based on that the time range of VAW coincides partially or completely with the time range of transmitting the UL SRS-Pos to the base station by the terminal a, the terminal a may determine a priority relationship between the VAW and the UL SRS-Pos according to the priority type parameter and perform the ATA and/or AFA within the time range of VAW according to the priority relationship between the VAW and the UL SRS-Pos.

Exemplarily, in an embodiment, based on that a priority of the VAW is higher than a priority of the UL SRS-Pos, the terminal a may select any moment within the time range of VAW as a first moment and perform the ATA and/or AFA at the first moment; if the terminal a needs to transmit the UL SRS-Pos to the base station at the first moment, which means that the ATA and/or AFA performed by the terminal a collides with the moment of processing the UL SRS-Pos and/or orthogonal frequency division multiplexing (OFDM) symbols, the terminal a considers the UL SRS-Pos as an invalid signal, which means that the UL SRS-Pos is not transmitted to the base station; and if the ATA and/or AFA performed by the terminal a does not collide with the moment of processing the UL SRS-Pos and/or orthogonal frequency division multiplexing (OFDM) symbols, the UL SRS-Pos is a valid signal, and the terminal a may transmit the UL SRS-Pos to the base station.

In another embodiment, based on that the priority of the VAW is lower than the priority of the UL SRS-Pos, it is assumed that the terminal a transmits the UL SRS-Pos to the base station at a second moment within the time range of transmitting the UL SRS-Pos to the base station by the terminal a, and the second moment is any moment within the time range of transmitting the UL SRS-Pos to the base station by the terminal a. The terminal a may perform the ATA and/or AFA at any moment within the time range of VAW except the second moment. In the embodiments of the present disclosure, when there is no moment for performing the ATA and/or AFA in one UL SRS-Pos cycle, the cycle is an invalid cycle.

In another embodiment, it is assumed that the notification signaling includes the predefined rule for indicating the terminal a to perform the ATA and/or AFA, the terminal a may transmit the UL SRS-Pos to the base station according to the predefined rule after receiving the notification signaling and then perform the ATA and/or AFA, which means that the terminal a does not perform the ATA and/or AFA at a moment of transmitting the UL SRS-Pos to the base station by the terminal a.

Step S604: the base station measures the UL SRS-Pos to obtain an uplink positioning measurement.

The base station may measure the UL SRS-Pos to obtain the uplink positioning measurement after receiving the UL SRS-Pos transmitted by the terminal a in the step S603. The uplink positioning measurement may include an RTOA, a time difference between transmitting and receiving of a base station, an uplink POA or an uplink PDOA.

Step S605: the base station transmits the uplink positioning measurement to the LMF.

Step S606: the terminal a transmits the time information of the ATA and/or AFA to the LMF.

After the terminal a performs the ATA and/or AFA according to the notification signaling in the step S603, the terminal a may transmit the indication information and the time information of the ATA and/or AFA performed by the terminal a to the LMF.

Step S607: the LMF determines the position of the terminal a.

In an embodiment, before the LMF determines the position of the terminal a, the LMF may also receive base station position information transmitted by the base station.

Through the above method, the LMF may receive time information of the ATA and/or AFA after each ATA and/or AFA performed by the terminal a and then determine times of two adjacent ATA and/or AFA performed by the terminal. The LMF may determine the position of the terminal a according to the uplink positioning measurement transmitted by the base station and position information of each base station associated with the terminal a within the time range between two adjacent ATA and/or AFA performed by the terminal a.

Exemplarily, the LMF may determine the position of the terminal a according to Formula 1 and Formula 2, and a specific implementation is similar to steps of the above downlink positioning method, which is not described in detail here.

Figure 8:
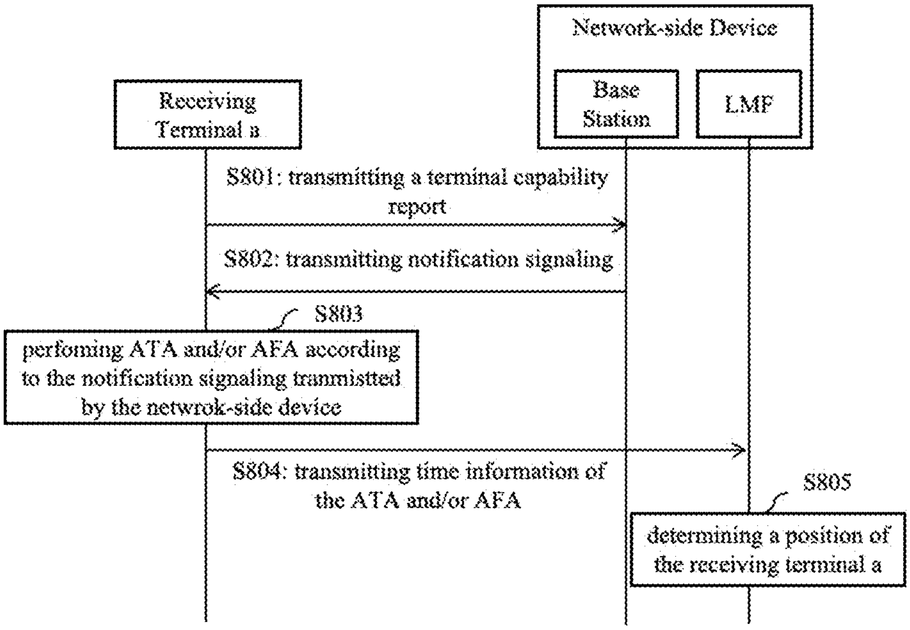
FIG. 8 is a schematic flowchart of interaction of a sidelink positioning method provided by the embodiments of the present disclosure.

FIG. 8 shows a flowchart of interaction of a sidelink positioning method provided by the embodiments of the present disclosure. The method is described by taking the network-side device and a receiving terminal a as an example and the receiving terminal a represents any receiving terminal. As shown in FIG. 8, the method includes the following steps.

Step S801: the receiving terminal a transmits the terminal capability report to the network-side device.

Step S802: the network-side device transmits notification signaling to the receiving terminal a.

Step S803: the receiving terminal a performs the ATA and/or AFA according to the notification signaling transmitted by the network-side device.

In one embodiment, before the receiving terminal a performs the ATA and/or AFA according to the notification signaling transmitted by the network-side device, the receiving terminal a may also receive a resource configuration parameter of the SL PRS transmitted by the LMF, and determine a time range of an MG or a PPW according to the resource configuration parameter of the SL PRS. The receiving terminal a may receive the SL PRS transmitted by a transmitting terminal b within the time range, and measure the SL PRS to obtain a sidelink positioning measurement.

In an embodiment, it is assumed that the notification signaling includes the VAW configuration parameter and the priority type parameter for indicating the receiving terminal a to perform the ATA and/or AFA, and after the receiving terminal a receives the notification signaling, the receiving terminal a may compare a time range of the VAW indicated by the VAW configuration parameter with the time range of the MG or the PPW determined according to the resource configuration parameter of the SL PRS and determine whether the time range of VAW coincides with the time range of the MG or the PPW.

In an embodiment, based on that the time range of VAW does not coincide with the time range of the MG or the PPW, the receiving terminal a may perform the ATA and/or AFA within the time range of VAW; and receive the SL PRS transmitted by the transmitting terminal b within the time range of the MG or the PPW, and measure the SL PRS to obtain the sidelink positioning measurement.

In the embodiments of the present disclosure, the sidelink positioning measurement may include a TDOA, a time difference between transmitting and receiving of the terminal of the receiving terminal, an SL POA or an SL PDOA.

In another embodiment, based on that the time range of VAW coincides partially or completely with the time range of the MG or the PPW, the receiving terminal a may determine a priority relationship between the VAW and the SL PRS according to the priority type parameter and perform the ATA and/or AFA within the time range of VAW according to the priority relationship between the VAW and the SL PRS.

Exemplarily, in an embodiment, based on that the priority of the VAW is higher than a priority of the SL PRS, the receiving terminal a may select any moment within the time range of VAW as a first moment and perform the ATA and/or AFA at the first moment; and if the receiving terminal a receives the SL PRS transmitted by the transmitting terminal b at the first moment, which means that the ATA and/or AFA performed by the receiving terminal a collides with the moment of processing the SL PRS and/or the orthogonal frequency division multiplexing (OFDM) symbols, the receiving terminal a may discard the SL PRS corresponding to the first moment, which means that the receiving terminal a may consider the SL PRS as an invalid signal. If the ATA and/or AFA performed by the receiving terminal a does not collide with the moment of processing the SL PRS and/or the orthogonal frequency division multiplexing (OFDM) symbols, the SL PRS is a valid signal, which means that the receiving terminal a may measure the received SL PRS transmitted by the transmitting terminal b to obtain the sidelink positioning measurement.

In another embodiment, based on that the priority of the VAW is lower than the priority of the SL PRS, it is assumed that the receiving terminal a receives the SL PRS transmitted by the transmitting terminal b at the second moment within the time range of the MG or the PPW, the receiving terminal a may measure the SL PRS to obtain the sideline positioning measurement, and the second moment is any moment within the time range of the MG or the PPW. The receiving terminal a may perform the ATA and/or AFA at any moment within the time range of VAW except the second moment. In the embodiments of the present disclosure, when there is no moment for performing the ATA and/or AFA in one SL PRS cycle, the cycle is an invalid cycle.

In another embodiment, it is assumed that the notification signaling includes the predefined rule for indicating the receiving terminal a to perform the ATA and/or AFA, the receiving terminal a may measure the received SL PRS according to the predefined rule after receiving the notification signaling to obtain the sidelink positioning measurement, and then perform the ATA and/or AFA, which means that the receiving terminal a does not perform the ATA and/or AFA within a time range of receiving the SL PRS transmitted by the transmitting terminal b and measuring.

Step S804: the receiving terminal a transmits time information of the ATA and/or AFA to the LMF.

After the receiving terminal a performs the ATA and/or AFA according to the notification signaling in the step S803, the receiving terminal a may transmit the indication information and the time information of the ATA and/or AFA performed by the receiving terminal a to the LMF, and the indication information is used to indicate that the receiving terminal a has performed the ATA and/or AFA.

Step S805: the LMF determines a position of the receiving terminal a.

In an embodiment, before the LMF determines the position of the receiving terminal a, the LMF may also receive the sidelink positioning measurement transmitted by the receiving terminal a, and the sidelink positioning measurements are transmitted to the LMF after the receiving terminal a measures the SL PRS transmitted by the transmitting terminal b. The LMF may receive sidelink is within a time range between two adjacent ATA and/or AFA performed by the receiving terminal a.

In an embodiment, before the LMF determines the position of the receiving terminal a, the LMF may also receive quality information of the sidelink positioning measurement transmitted by the receiving terminal a and base station position information transmitted by the base station. The quality information of the sidelink positioning measurement may be one or more of an SNR, an SINR or a variance of a measurement error.

Through above method, the LMF may receive transmitted time information of the ATA and/or AFA after each ATA and/or AFA performed by the receiving terminal a and then determine time between two adjacent ATA and/or AFA performed by the receiving terminal a. The LMF may determine the position of the receiving terminal a according to the downlink positioning measurement transmitted by the receiving terminal a, the quality information of the downlink positioning measurement and position information of each base station associated with the receiving terminal a within the time range between two adjacent ATA and/or AFA performed by the receiving terminal a.

Exemplarily, the LMF may determine the position of the receiving terminal a according to Formula 1 and Formula 2, and a specific implementation is similar to steps of the above downlink positioning method, which is not described in detail here.

Figure 9:
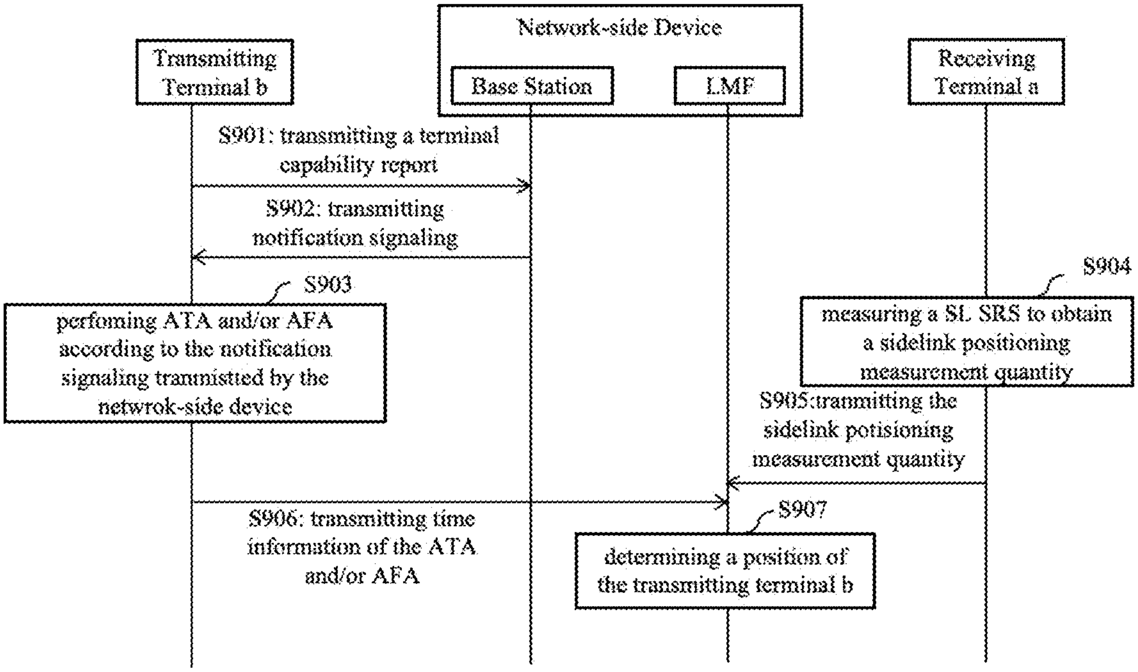
FIG. 9 is a schematic flowchart of interaction of another sidelink positioning method provided by the embodiments of the present disclosure.

FIG. 9 shows a flowchart of interaction of another sidelink positioning method provided by the embodiments of the present disclosure. The method is described by taking the network-side device and the transmitting terminal b as an example, and the transmitting terminal b represents any one transmitting terminal. As shown in FIG. 9, the method includes the following steps.

Step S901: the transmitting terminal b transmits the terminal capability report to the network-side device.

Step S902: the network-side device transmits notification signaling to the transmitting terminal b.

Step S903: the transmitting terminal b performs the ATA and/or AFA according to the notification signaling transmitted by the network-side device.

In one embodiment, before the transmitting terminal b performs the ATA and/or AFA according to the notification signaling transmitted by the network-side device, the transmitting terminal b may also receive a resource configuration parameter of the SL PRS transmitted by the base station, and determine a time range of transmitting the SL PRS to the receiving terminal a by the transmitting terminal b according to the resource configuration parameter of the SL PRS.

In an embodiment, it is assumed that the notification signaling includes the VAW configuration parameter and the priority type parameter for indicating the transmitting terminal to perform the ATA and/or AFA, and after the transmitting terminal b receives the notification signaling, the transmitting terminal b may compare a time range of the VAW indicated by the VAW configuration parameter with the time range of transmitting the SL PRS to the receiving terminal a by the transmitting terminal b determined according to the resource configuration parameter of the SL PRS and determine whether the time range of VAW coincides with the time range of transmitting the SL PRS to the receiving terminal a by the transmitting terminal b.

In an embodiment, based on that the time range of VAW does not coincide with the time range of transmitting the SL PRS to the receiving terminal a by the transmitting terminal b, the transmitting terminal b may perform the ATA and/or AFA within the time range of VAW; and transmit the SL PRS to the receiving terminal a within the time range of transmitting the SL PRS to the receiving terminal a by the transmitting terminal b.

In another embodiment, based on that the time range of VAW coincides partially or completely with the time range of transmitting the SL PRS to the receiving terminal a by the transmitting terminal b, the transmitting terminal b may determine a priority relationship between the VAW and the SL PRS according to the priority type parameter and perform the ATA and/or AFA within the time range of VAW according to the priority relationship between the VAW and the SL PRS.

Exemplarily, in an embodiment, based on that the priority of the VAW is higher than the priority of the SL PRS, the transmitting terminal b may select any moment within the time range of VAW as a first moment and perform the ATA and/or AFA at the first moment; and if the transmitting terminal b needs to transmit the SL PRS to the receiving terminal a at the first moment, which means that the ATA and/or AFA performed by the transmitting terminal b collides with the moment of processing the SL PRS and/or the orthogonal frequency division multiplexing (OFDM) symbols, the transmitting terminal b may consider the SL PRS as the invalid signal, which mean that the transmitting terminal does not transmit the SL PRS to the receiving terminal a; and if the ATA and/or AFA performed by the transmitting terminal b does not collide with the moment of processing the SL PRS and/or the orthogonal frequency division multiplexing (OFDM) symbols, the SL PRS is the valid signal, which means that the transmitting terminal b may transmit the SL PRS to the receiving terminal a.

In another embodiment, based on that the priority of the VAW is lower than the priority of the SL PRS, it is assumed that the transmitting terminal b transmits the SL PRS to the receiving terminal a at the second moment within the time range of transmitting the SL PRS to the receiving terminal a by the transmitting terminal b, and the second moment is any moment within the time range of transmitting the SL PRS to the receiving terminal a by the transmitting terminal b. The transmitting terminal b may perform the ATA and/or AFA at any moment within the time range of VAW except the second moment. In the embodiments of the present disclosure, when there is no moment for performing the ATA and/or AFA in one SL PRS cycle, the cycle is an invalid cycle.

In another embodiment, it is assumed that the notification signaling includes the predefined rule for indicating the transmitting terminal b to perform the ATA and/or AFA, the transmitting terminal b may transmit the SL PRS to the receiving terminal a according to the predefined rule after receiving the notification signaling and then perform the ATA and/or AFA, which means that the transmitting terminal b does not perform the ATA and/or AFA at a moment of transmitting the SL PRS to the receiving terminal a by the transmitting terminal b.

Step S904: the receiving terminal a measures the SL PRS to obtain the sidelink positioning measurement.

Through the step S904 the receiving terminal a may measure the SL PRS after receiving the SL PRS transmitted by the transmitting terminal b to obtain the sidelink positioning measurement.

Step S905: the receiving terminal a transmits the sidelink positioning measurement to the LMF.

Step S906: the transmitting terminal b transmits the time information of the ATA and/or AFA to the LMF.

The transmitting terminal b may transmit the indication information, and the time information of the ATA and/or AFA performed by the transmitting terminal b to the LMF after the transmitting terminal b performs the ATA and/or AFA according to the notification signaling in the step S903.

Step S907: The LMF determines a position of the transmitting terminal b.

In an embodiment, before the LMF determines the position of the transmitting terminal b, the LMF may also receive base station position information transmitted by the base station.

Through above method, the LMF may receive transmitted time information of the ATA and/or AFA after each ATA and/or AFA performed by the transmitting terminal b and then determine time between two adjacent ATA and/or AFA performed by the transmitting terminal b. The LMF may determine the position of the transmitting terminal b according to the uplink positioning measurement transmitted by the receiving terminal a and position information of each base station associated with the transmitting terminal b within the time range between two adjacent ATA and/or AFA performed by the transmitting terminal b.

Exemplarily, the LMF may determine the position of the transmitting terminal b according to Formula 1 and Formula 2, and a specific implementation is similar to steps of the above downlink positioning method, which is not described in detail here.

Figure 10:
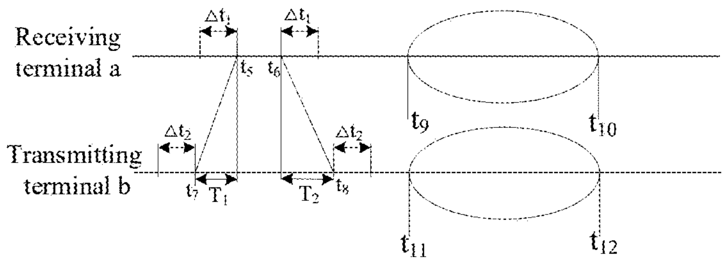
FIG. 10 is another schematic diagram of a relationship between a terminal performing ATA and/or AFA and the terminal calculating a time difference between transmitting and receiving of the terminal in Multi-RTT positioning provided by the embodiments of the present disclosure.

In the embodiments of the present disclosure, the sidelink positioning method shown in FIG. 8 and FIG. 9 is also suitable for Multi-RTT positioning. When the positioning method is Multi-RTT positioning, neither the receiving terminal a nor the transmitting terminal b can perform the ATA and/or AFA within the time range of calculating the time difference between transmitting and receiving of the terminal by the receiving terminal a and the transmitting terminal b, which means that within a time range of measuring the SL PRS by the receiving terminal a and obtaining the sidelink positioning measurement, as shown in FIG. 10, $[t_5-\Delta t_1, t_6+\Delta t_1]$ is the time range of calculating the time difference between transmitting and receiving of the terminal by the receiving terminal a, $t_9$ represents a start moment of the time range of the ATA and/or AFA performed by the receiving terminal a, $t_{10}$ represents an end moment of the time range of the ATA and/or AFA performed by the receiving terminal a, $\Delta t_1$ represent a margin, and $\Delta t_1 \geq 0$; $[t_7-\Delta t_2, t_8+\Delta t_2]$ is the calculating the time difference between transmitting and receiving of the terminal by the transmitting terminal b, $t_{11}$ represents a start moment of the time range of the ATA and/or AFA performed by the transmitting terminal b, $t_{12}$ represents an end moment of the time range of the ATA and/or AFA performed by the transmitting terminal b, $\Delta t_2$ represents a margin, and $\Delta t_2 \geq 0$; and RTT of the SL PRS between the receiving terminal a and the transmitting terminal b may be represented by Formula 3.

$$RTT = T_1 + T_2 = (t_5 - t_7) + (t_8 - t_6) = (t_5 - t_6) + (t_8 - t_7) \quad \text{(Formula 3)}$$

In an embodiment, in the sidelink positioning method shown in FIG. 8 and FIG. 9, the transmitting terminal b is relative to the receiving terminal a, exemplarily, UE1 may transmit the SL PRS to UE2 and may also receive the SL PRS transmitted by the UE2, so for the UE2, the UE1 may be the transmitting terminal or the receiving terminal.

Figure 11:
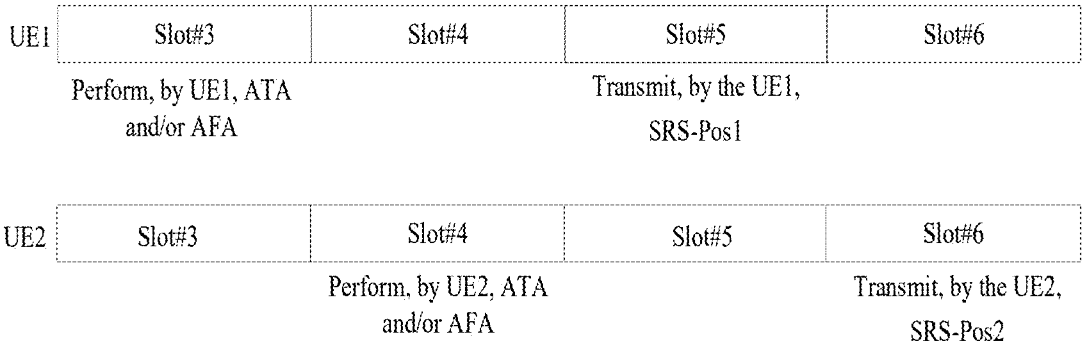
FIG. 11 is a schematic diagram of performing, by a transmitting terminal and a receiving terminal, ATA and/or AFA provided by the embodiments of the present disclosure.

In this embodiment, the transmitting terminal b may be regarded as a base station of the receiving terminal a. Exemplarily, as shown in FIG. 11, when the UE2 is the transmitting terminal and the UE1 is the receiving terminal, it is assumed that four successive SL slots are included in a 5 ms SL PRS cycle, the UE2 may indicate the UE1 to perform the ATA and/or AFA operation at the first SL slot, which means that slot #3 (slot #3), the UE2 may perform the ATA and/or AFA operation at the second SL slot, which means that slot #4 (slot #4); the UE1 may transmit SRS-Pos1 to the UE2 in the third SL slot, which means that slot #5 (slot #5); and the UE2 may transmit SRS-Pos2 to the UE1 in the fourth SL slot, which means that slot #6 (slot #6). Thus, the terminal does not perform the ATA and/or AFA operation within the time range of processing the SL PRS by the terminal.

Figure 12:
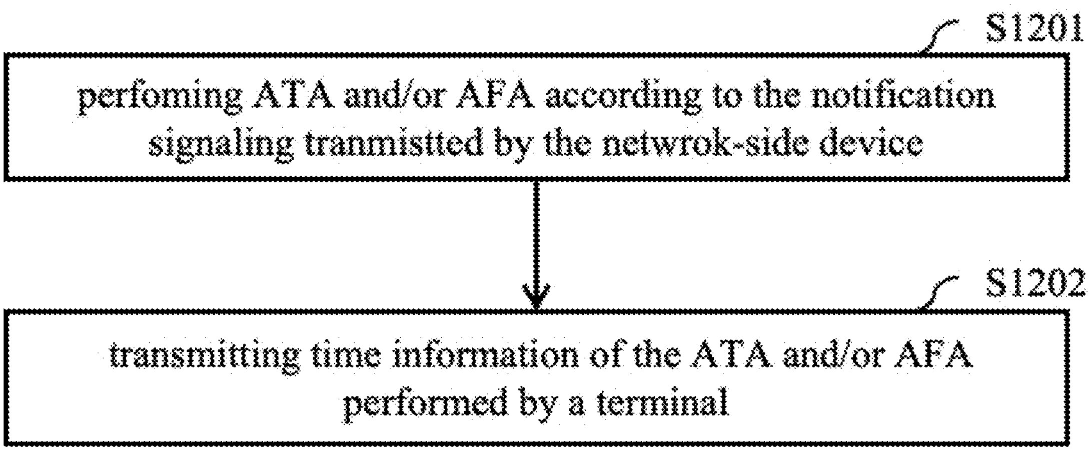
FIG. 12 is a schematic flowchart of a method for positioning a terminal provided by the embodiments of the present disclosure.

An embodiment provided by the present disclosure provides a flowchart of a method for positioning a terminal. The method is performed by the terminal. As shown in FIG. 12, the method includes the following steps.

Step S1201: performing ATA and/or AFA according to notification signaling transmitted by a network-side device.

The notification signaling includes indication information for indicating the terminal to perform the ATA and/or AFA.

Step S1202: transmitting time information of the ATA and/or AFA performed by the terminal.

The time information of the ATA and/or AFA is used to determine a position of the terminal.

Figure 13:
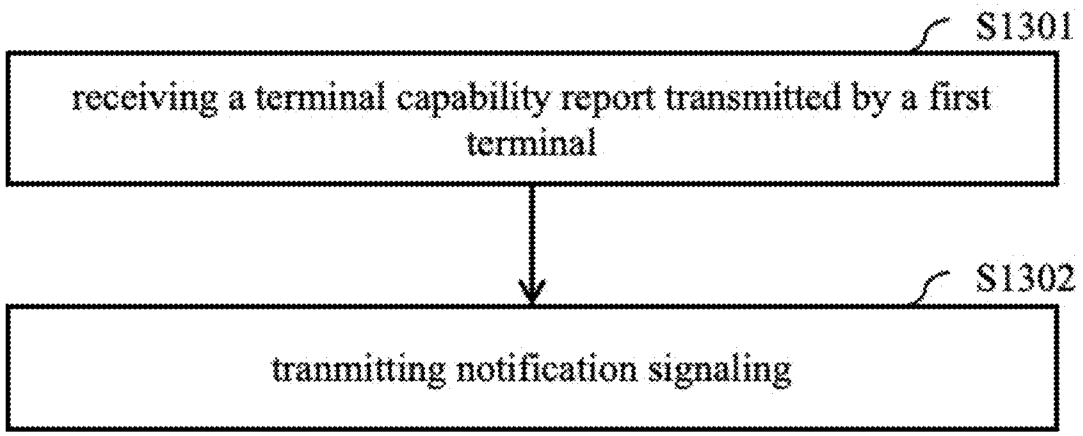
FIG. 13 is a schematic flowchart of a method for positioning a terminal provided by the embodiments of the present disclosure.

An embodiment provided by the present disclosure provides a flowchart of a method for positioning a terminal. The method is performed by a base station. As shown in FIG. 13, the method includes the following steps.

Step S1301: receiving a terminal capability report transmitted by a first terminal.

The terminal capability report represents that the first terminal supports performing the ATA and/or AFA within a valid adjustment window (VAW) or supports performing the ATA and/or AFA according to a predefined rule.

Step S1302: transmitting notification signaling.

The notification signaling is used to indicate the first terminal to perform the ATA and/or AFA.

Figure 14:
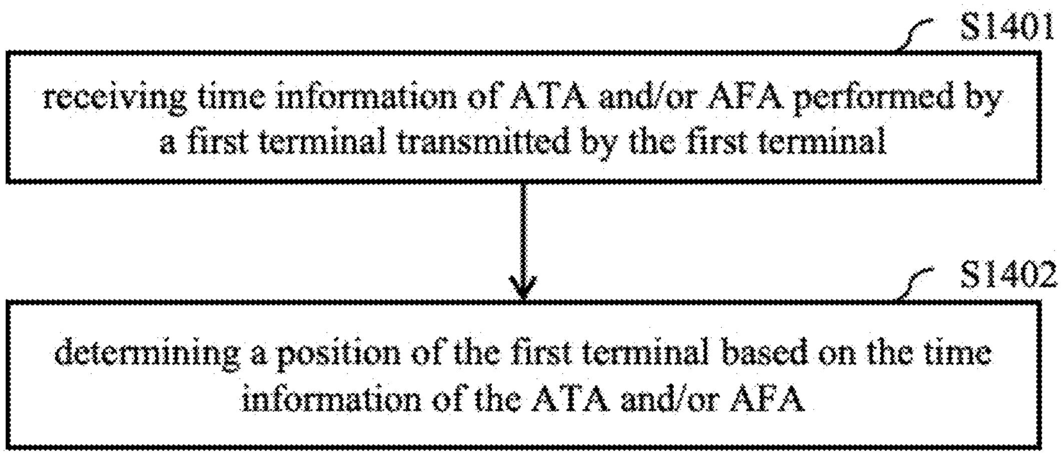
FIG. 14 is a schematic flowchart of a method for positioning a terminal provided by the embodiments of the present disclosure.

An embodiment provided by the present disclosure provides a flowchart of a method for positioning a terminal. The method is performed by an LMF. As shown in FIG. 14, the method includes the following steps.

Step S1401: receiving time information of the ATA and/or AFA performed by the first terminal transmitted by the first terminal.

Step S1402: determining a position of the first terminal based on the time information of the ATA and/or AFA.

Figure 15:
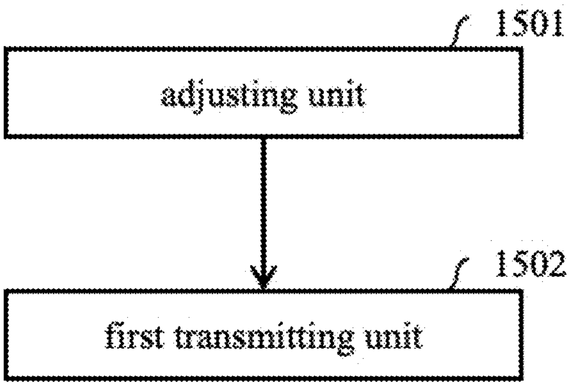
FIG. 15 is a structural block diagram of a terminal provided by the embodiments of the present disclosure.

An embodiment provided by the present disclosure provides a terminal, as shown in FIG. 15, including an adjusting unit 1501 and a first transmitting unit 1502.

The adjusting unit 1501 is configured to perform ATA and/or AFA according to notification signaling transmitted by a network-side device; and the notification signaling includes indication information for indicating the terminal to perform the ATA and/or AFA.

The first transmitting unit 1502 is configured to transmit time information of the ATA and/or AFA performed by the terminal to an LMF; and the time information of the ATA and/or AFA is used to determine a position of the terminal.

In some embodiments, before the adjusting unit 1501, the terminal may further include a processing unit, which may be configured to:

transmit a report that the terminal supports performing the ATA and/or AFA within a valid adjustment window (VAW) to the network-side device, and receive the notification signaling transmitted by the network-side device; or transmit a report to the network-side device that the terminal supports performing the ATA and/or AFA according to a predefined rule, and receive the notification signaling transmitted by the network-side device.

In some embodiments, the adjusting unit 1501 is configured to:

perform the ATA and/or AFA within a time range of the VAW based on that a time range of the VAW indicated by a VAW configuration parameter does not coincide with a signal processing time range; and the signal processing time range refers to a time range of processing a positioning reference signal.

In some embodiments, the adjusting unit 1501 is configured to:

perform the ATA and/or AFA within the time range of VAW according to a priority relationship between the VAW and the positioning reference signal based on that the time range of the VAW indicated by the VAW configuration parameter coincides partially or completely with the signal processing time range.

In some embodiments, the adjusting unit 1501 is configured to:

perform the ATA and/or AFA at a first moment based on that a priority of the VAW is higher than a priority of the positioning reference signal, and the first moment is any moment within the time range of VAW, and a positioning reference signal of the first moment is discarded; and perform the ATA and/or AFA at any moment within the time range of VAW except a second moment based on that the priority of the VAW is lower than the priority of the positioning reference signal, and the second moment is a moment of processing the positioning reference signal by the terminal.

In some embodiments, the indication information included in the notification signaling includes the predefined rule; the predefined rule indicates that the terminal does not perform the ATA and/or AFA within the signal processing time range and performs the ATA and/or AFA after the positioning reference signal is processed; and the signal processing time range refers to a time range of processing the positioning reference signal.

In some embodiments, the positioning reference signal is a downlink positioning reference signal (DL PRS), and the signal processing time range is a time range of a measurement gap (MG) or a downlink positioning reference signal processing window (PPW) determined according to a resource configuration parameter of the DL PRS transmitted by an LMF; processing the positioning reference signal refers to receiving the DL PRS transmitted by a base station and performing a measurement; or the positioning reference signal is an uplink sounding reference signal for positioning (UL SRS-Pos), and the signal processing time range is determined according to a resource configuration parameter of the UL SRS-Pos transmitted by the base station; processing the positioning reference signal refers to transmitting the UL SRS-Pos to the base station; or the positioning reference signal is a sidelink positioning reference signal (SL PRS), the terminal is a receiving terminal, and the signal processing time range is determined according to a time range of an MG or a PPW indicated in a resource configuration parameter of the SL PRS transmitted by the LMF; processing the positioning reference signal refers to receiving the SL PRS transmitted by a transmitting terminal and performing a measurement; or the positioning reference signal is the SL PRS, the terminal is the transmitting terminal, and the signal processing time range is determined according to a resource configuration parameter of the SL PRS transmitted by the base station; and processing the positioning reference signal refers to transmitting the SL PRS to the receiving terminal.

In some embodiments, the notification signaling is long-term-evolution positioning protocol (LPP) signaling transmitted by the LMF; or the notification signaling is radio resource control (RRC) signaling, media access control-control element (MAC CE) signaling or downlink control information (DCI) signaling transmitted by the base station.

Exemplarily, the network-side device may be but is not limited to the base station, the LMF and other entities or devices.

Figure 16:
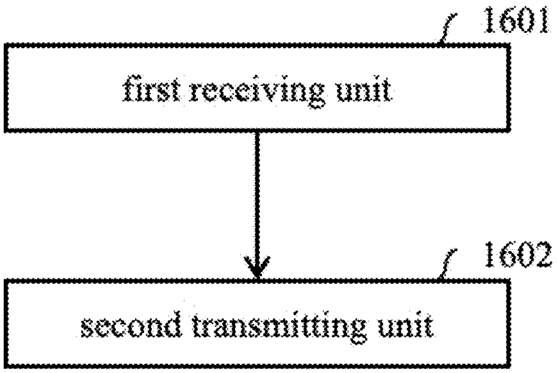
FIG. 16 is a structural block diagram of a base station provided by the embodiments of the present disclosure.

An embodiment provided by the present disclosure provides a base station, as shown in FIG. 16, including a first receiving unit 1601 and a second transmitting unit 1602.

The first receiving unit 1601 is configured to receive a terminal capability report transmitted by a first terminal; and the terminal capability report represents that the first terminal supports performing ATA and/or AFA within a valid adjustment window (VAW) or supports performing the ATA and/or AFA according to a predefined rule.

The second transmitting unit 1602 is configured to transmit notification signaling to the first terminal; and the notification signaling is used to indicate the first terminal to perform the ATA and/or AFA.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; the positioning reference signal is a downlink positioning reference signal (DL PRS), an uplink sounding reference signal for positioning (UL SRS-Pos) or a sidelink positioning reference signal (SL PRS); and the signal processing time range refers to a time range of processing the positioning reference signal.

In some embodiments, the base station includes a serving base station and a neighbor base station.

In some embodiments, the notification signaling is radio resource control (RRC) signaling, media access control-control element (MAC CE) signaling or downlink control information (DCI) signaling.

Figure 17:
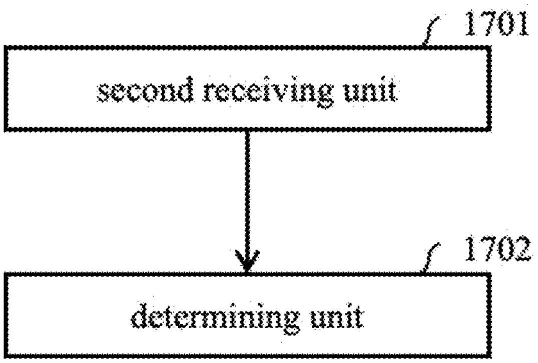
FIG. 17 is a structural block diagram of an LMF provided by the embodiments of the present disclosure.

An embodiment provided by the present disclosure provides an LMF, as shown in FIG. 17, including a second receiving unit 1701 and a determining unit 1702.

The second receiving unit 1701 is configured to receive time information of ATA and/or AFA performed by the first terminal transmitted by the first terminal.

The determining unit 1702 is configured to determine a position of the first terminal based on the time information of the ATA and/or AFA.

In some embodiments, the determining unit 1702 is configured to:

determine a time range between two adjacent ATA and/or AFA performed by the first terminal based on the time information of the ATA and/or AFA; and determine the position of the first terminal according to various positioning measurements of the first terminal obtained within the time range; and the positioning measurements are obtained by measuring a positioning reference signal corresponding to the first terminal.

In some embodiments, before the second receiving unit 1701, the LMF may also include a second processing unit and be configured to:

receive a terminal capability report transmitted by the first terminal; and the terminal capability report represents that the first terminal supports performing the ATA and/or AFA within a valid adjustment window (VAW) or supports performing the ATA and/or AFA according to a predefined rule; and transmit notification signaling to the first terminal; and the notification signaling is used to indicate the first terminal to perform the ATA and/or AFA.

In some embodiments, the notification signaling is long-term-evolution positioning protocol (LPP) signaling.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; and the signal processing time range refers to a time range of processing the positioning reference signal.

In some embodiments, the positioning reference signal is a DL PRS, and a positioning measurement is an RSTD, a time difference between transmitting and receiving of the terminal, a downlink POA, or a downlink PDOA transmitted by the first terminal; or the positioning reference signal is a UL SRS-Pos, and the positioning measurement is an uplink RTOA, a time difference between transmitting and receiving of a base station, an uplink POA, or an uplink PDOA transmitted by a base station; or the positioning reference signal is an SL PRS, the first terminal is a receiving terminal, and the positioning measurement is a TDOA, a time difference between transmitting and receiving of the receiving terminal, an SL POA, or an SL PDOA transmitted by the first terminal; or the positioning reference signal is the SL PRS, the first terminal is a transmitting terminal, and the positioning measurement is a time difference between transmitting and receiving of the first terminal.

In some embodiments, based on that the positioning reference signal is the DL PRS, the LMF further includes a third receiving unit, and the third receiving unit is configured to:

receive a positioning measurement and quality information of the positioning measurement obtained by measuring the DL PRS and transmitted by the first terminal.

In some embodiments, based on that the positioning reference signal is the SL PRS, the LMF further includes a fourth receiving unit, and the fourth receiving unit is configured to:

receive a positioning measurement and quality information of the positioning measurement obtained by measuring the SL PRS and transmitted by the first terminal.

In some embodiments, the quality information includes an SNR, an SINR or a variance of a measurement error.

Embodiments of the present disclosure further provide a terminal. The terminal can perform any method for positioning the terminal implemented in the above embodiments.

Figure 18:
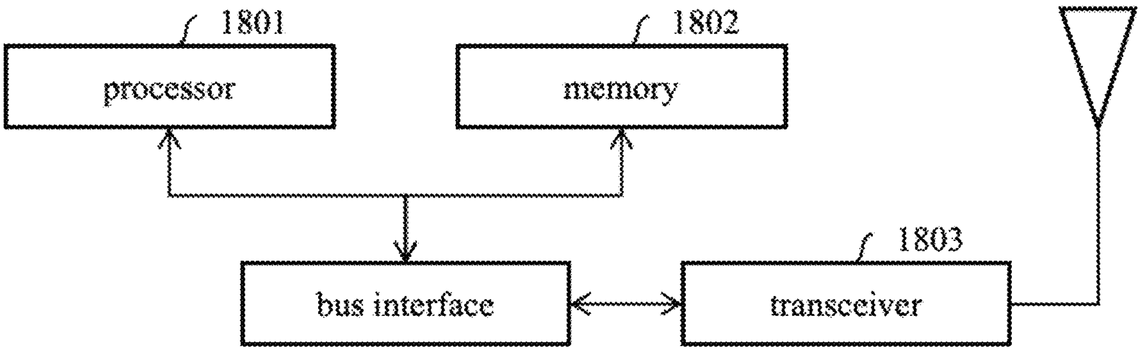
FIG. 18 is a schematic structural diagram of a terminal provided by the embodiments of the present disclosure.

FIG. 18 shows a schematic structural diagram of the terminal provided by the embodiments of the present disclosure, which means that shows another schematic structural diagram of the terminal. As shown in FIG. 18, the terminal includes a processor 1801, a memory 1802 and a transceiver 1803.

The processor 1801 is responsible for managing a bus architecture and general processing, and the memory 1802 may store data used by the processor 1801 when performing operations. The transceiver 1803 is configured to receive and transmit data under control of the processor 1801.

The bus architecture may include any quantity of interconnected buses and bridges, specifically, linking various circuits of one or more processors represented by the processor 1801 and a memory represented by the memory 1802 together. The bus architecture may also link various other circuits such as a peripheral device, a voltage stabilizer and a power management circuit, which are well-known in the art and therefore, will not be further described herein. A bus interface provides an interface. The processor 1801 is responsible for managing a bus architecture and general processing, and the memory 1802 may store data used by the processor 1801 when performing operations.

Flows disclosed in the embodiments of the present disclosure may be applied to the processor 1801 or implemented by the processor 1801. In an implementing process, various steps of a signal processing flow may be completed by an integrated logic circuit of hardware in the processor 1801 or instructions of a software form. The processor 1801 may be a general-purpose processor, a digital signal processor, an application-specific integrated circuit, a field-programmable gate array or another programmable logic device, discrete gate, transistor logic device and discrete hardware component and may implement or perform the methods, steps and logic block diagrams disclosed in the embodiments of the present disclosure. The general-purpose processor may be a microprocessor or any conventional processor. The steps of the methods disclosed by the embodiments of the present disclosure may be directly embodied by being performed and completed by a hardware processor, or performed and completed by a combination of hardware and software modules in the processor. The software module may be located in a storage medium mature in the art such as a random-access memory, a flash memory, a read-only memory, a programmable read-only memory or an electrically erasable programmable memory and a register. The storage medium is located in the memory 1802, and the processor 1801 reads information in the memory 1802, and completes steps of the signal processing flow in combination with hardware.

Specifically, the processor 1801 is configured to read computer instructions in the memory 1802 and implement, when executing the computer instructions:

performing ATA and/or AFA according to notification signaling transmitted by a network-side device; and the notification signaling includes indication information for indicating the terminal to perform the ATA and/or AFA; and controlling the transceiver to transmit time information of the ATA and/or AFA performed by the terminal to an LMF; and the time information of the ATA and/or AFA is used to determine a position of the terminal.

In some embodiments, the transceiver 1803 is configured to:

transmit a report that the terminal supports performing the ATA and/or AFA within a valid adjustment window (VAW) to the network-side device; or transmit a report to the network-side device that the terminal supports performing the ATA and/or AFA according to a predefined rule; and receive the notification signaling transmitted by the network-side device.

In some embodiments, the processor 1801 is configured to:

perform the ATA and/or AFA within a time range of the VAW based on that a time range of the VAW indicated by a VAW configuration parameter does not coincide with a signal processing time range; and the signal processing time range refers to a time range of processing a positioning reference signal.

In some embodiments, the processor 1801 is configured to:

perform the ATA and/or AFA within the time range of VAW according to a priority relationship between the VAW and the positioning reference signal based on that the time range of the VAW indicated by the VAW configuration parameter coincides partially or completely with the signal processing time range.

In some embodiments, the processor 1801 is configured to:

perform the ATA and/or AFA at a first moment based on that a priority of the VAW is higher than a priority of the positioning reference signal, and the first moment is any moment within the time range of VAW; and perform the ATA and/or AFA at any moment within the time range of VAW except a second moment based on that the priority of the VAW is lower than the priority of the positioning reference signal, and the second moment is a moment of processing the positioning reference signal by the terminal.

In some embodiments, the indication information included in the notification signaling includes the predefined rule; the predefined rule indicates that the terminal does not perform the ATA and/or AFA within the signal processing time range and performs the ATA and/or AFA after the positioning reference signal is processed; and the signal processing time range refers to a time range of processing the positioning reference signal.

In some embodiments, the positioning reference signal is a downlink positioning reference signal (DL PRS), and the signal processing time range is a time range of an MG or a PPW determined according to a resource configuration parameter of the DL PRS transmitted by the LMF; processing the positioning reference signal refers to receiving the DL PRS transmitted by a base station and performing a measurement; or the positioning reference signal is a UL SRS-Pos, and the signal processing time range is determined according to a resource configuration parameter of the UL SRS-Pos transmitted by the base station; processing the positioning reference signal refers to transmitting the UL SRS-Pos to the base station; or the positioning reference signal is an SL PRS, the terminal is a receiving terminal, and the signal processing time range is determined according to a time range of an MG or a PPW indicated in a resource configuration parameter of the SL PRS transmitted by the LMF; processing the positioning reference signal refers to receiving the SL PRS transmitted by a transmitting terminal and performing a measurement; or the positioning reference signal is the SL PRS, the terminal is the transmitting terminal, and the signal processing time range is determined according to a resource configuration parameter of the SL PRS transmitted by the base station; and processing the positioning reference signal refers to transmitting the SL PRS to the receiving terminal.

In some embodiments, the notification signaling is LPP signaling transmitted by the LMF; or the notification signaling is RRC signaling, MAC CE signaling or DCI signaling transmitted by the base station.

Exemplarily, the network-side device may be but is not limited to the base station, the LMF and other entities or devices.

Embodiments of the present disclosure further provide a base station. The base station can perform any method for positioning the terminal implemented in the above embodiments.

Figure 19:
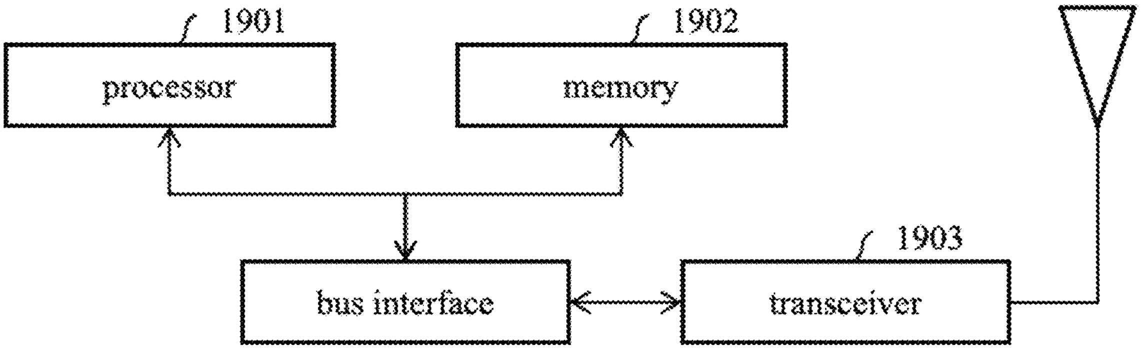
FIG. 19 is a schematic structural diagram of a base station provided by the embodiments of the present disclosure.

FIG. 19 shows a schematic structural diagram of the base station provided by the embodiments of the present disclosure, which means that showing another schematic structural diagram of the network-side device. As shown in FIG. 19, the network-side device includes a processor 1901, a memory 1902 and a transceiver 1903.

The processor 1901 is responsible for managing a bus architecture and general processing, and the memory 1902 may store data used by the processor 1901 when performing operations. The transceiver 1903 is configured to receive and transmit data under control of the processor 1901.

The bus architecture may include any quantity of interconnected buses and bridges, specifically, linking various circuits of one or more processors represented by the processor 1901 and a memory represented by the memory 1902 together. The bus architecture may also link various other circuits such as a peripheral device, a voltage stabilizer and a power management circuit, which are well-known in the art and therefore, will not be further described herein. A bus interface provides an interface. The processor 1901 is responsible for managing a bus architecture and general processing, and the memory 1902 may store data used by the processor 1901 when performing operations.

Flows disclosed in the embodiments of the present disclosure may be applied to the processor 1901 or implemented by the processor 1901. In an implementing process, various steps of a signal processing flow may be completed by an integrated logic circuit of hardware in the processor 1901 or instructions of a software form. The processor 1901 may be a general-purpose processor, a digital signal processor, an application-specific integrated circuit, a field-programmable gate array or another programmable logic device, discrete gate, transistor logic device and discrete hardware component and may implement or perform the methods, steps and logic block diagrams disclosed in the embodiments of the present disclosure. The general-purpose processor may be a microprocessor or any conventional processor. The steps of the methods disclosed by the embodiments of the present disclosure may be directly embodied by being performed and completed by a hardware processor, or performed and completed by a combination of hardware and software modules in the processor. The software module may be located in a storage medium mature in the art such as a random-access memory, a flash memory, a read-only memory, a programmable read-only memory or an electrically erasable programmable memory and a register. The storage medium is located in the memory 1902, and the processor 1901 reads information in the memory 1902, and completes steps of the signal processing flow in combination with hardware.

Specifically, the processor 1901 is configured to read a computer program in the memory 1902 and implement, when executing the computer program:

controlling the transceiver 1903 to receive a terminal capability report transmitted by a first terminal; and the terminal capability report represents that the first terminal supports performing ATA and/or AFA within a valid adjustment window (VAW) or supports performing the ATA and/or AFA according to a predefined rule; and transmitting notification signaling to the first terminal; and the notification signaling is used to indicate the first terminal to perform the ATA and/or AFA.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; and the positioning reference signal is a DL PRS, a UL SRS-Pos or an SL PRS.

In some embodiments, the base station includes a serving base station and a neighbor base station.

In some embodiments, the notification signaling is RRC signaling, MAC CE signaling or DCI signaling.

Embodiments of the present disclosure further provide an LMF. The LMF can perform any method for positioning the terminal implemented in the above embodiments.

Figure 20:
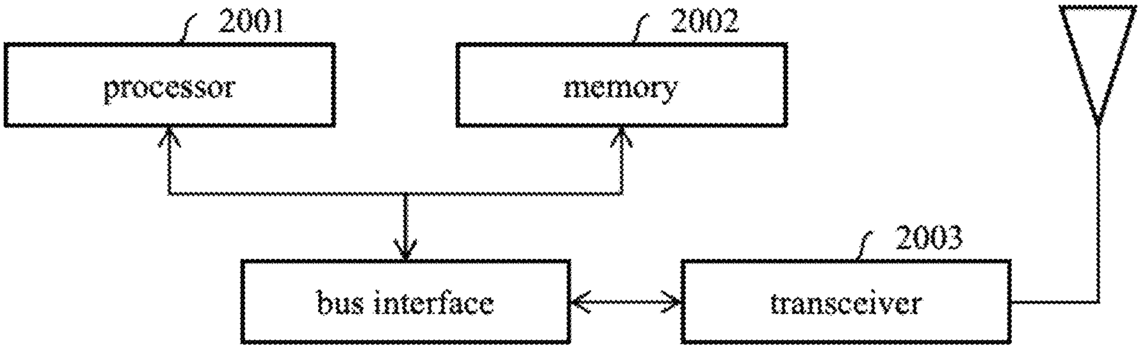
FIG. 20 is a schematic structural diagram of an LMF provided by the embodiments of the present disclosure.

FIG. 20 shows a schematic structural diagram of the LMF provided by the embodiments of the present disclosure, which means that showing another schematic structural diagram of the LMF. As shown in FIG. 20, the LMF includes a processor 2001, a memory 2002 and a transceiver 2003.

The processor 2001 is responsible for managing a bus architecture and general processing, and the memory 2002 may store data used by the processor 2001 when performing operations. The transceiver 2003 is configured to receive and transmit data under control of the processor 2001.

The bus architecture may include any quantity of interconnected buses and bridges, specifically, linking various circuits of one or more processors represented by the processor 2001 and a memory represented by the memory 2002 together. The bus architecture may also link various other circuits such as a peripheral device, a voltage stabilizer and a power management circuit, which are well-known in the art and therefore, will not be further described herein. A bus interface provides an interface. The processor 2001 is responsible for managing a bus architecture and general processing, and the memory 2002 may store data used by the processor 2001 when performing operations.

Flows disclosed in the embodiments of the present disclosure may be applied to the processor 2001 or implemented by the processor 2001. In an implementing process, various steps of a signal processing flow may be completed by an integrated logic circuit of hardware in the processor 2001 or instructions of a software form. The processor 2001 may be a general-purpose processor, a digital signal processor, an application-specific integrated circuit, a field-programmable gate array or another programmable logic device, discrete gate, transistor logic device and discrete hardware component and may implement or perform the methods, steps and logic block diagrams disclosed in the embodiments of the present disclosure. The general-purpose processor may be a microprocessor or any conventional processor. The steps of the methods disclosed by the embodiments of the present disclosure may be directly embodied by being performed and completed by a hardware processor, or performed and completed by a combination of hardware and software modules in the processor. The software module may be located in a storage medium mature in the art such as a random-access memory, a flash memory, a read-only memory, a programmable read-only memory or an electrically erasable programmable memory and a register. The storage medium is located in the memory 2002, and the processor 2001 reads information in the memory 2002, and completes steps of the signal processing flow in combination with hardware.

Specifically, the processor 2001 is configured to read a computer program in the memory 2002 and implement, when executing the computer program:

controlling the transceiver 2003 to receive time information of ATA and/or AFA performed by the first terminal transmitted by the first terminal; and determining a position of the first terminal based on the time information of the ATA and/or AFA.

In some embodiments, the processor 2001 is configured to:

determine a time range between two adjacent ATA and/or AFA performed by the first terminal based on the time information of the ATA and/or AFA; and determine the position of the first terminal according to various positioning measurements of the first terminal obtained within the time range; and the positioning measurements are obtained by measuring a positioning reference signal corresponding to the first terminal.

In some embodiments, the transceiver 2003 may further be configured to:

receive a terminal capability report transmitted by the first terminal; and the terminal capability report represents that the first terminal supports performing the ATA and/or AFA within a valid adjustment window (VAW) or supports performing the ATA and/or AFA according to a predefined rule; and transmit notification signaling; and the notification signaling is used to indicate the first terminal to perform the ATA and/or AFA.

In some embodiments, the notification signaling is long-term-evolution positioning protocol (LPP) signaling.

In some embodiments, the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; and the signal processing time range refers to a time range of processing the positioning reference signal.

In some embodiments, the positioning reference signal is a downlink positioning reference signal (DL PRS), a positioning measurement is a reference signal time difference (RSTD), a time difference between transmitting and receiving of the terminal, a downlink phase of arrival (POA) value, or a downlink phase difference of arrival (PDOA) transmitted by the first terminal; or the positioning reference signal is an uplink sounding reference signal for positioning (UL SRS-Pos), and the positioning measurement is an uplink relative time of arrival (RTOA), a time difference between transmitting and receiving of a base station, an uplink POA, or an uplink PDOA transmitted by a base station; or the positioning reference signal is a sidelink positioning reference signal (SL PRS), the first terminal is a receiving terminal, and the positioning measurement is a time difference of arrival (TDOA), a time difference between transmitting and receiving of the receiving terminal, an SL POA, or an SL PDOA transmitted by the first terminal; or the positioning reference signal is the SL PRS, the first terminal is a transmitting terminal, and the positioning measurement is a time difference between transmitting and receiving of the first terminal.

In some embodiments, the processor 2001 may further be configured to:

receive a positioning measurement and quality information of the positioning measurement obtained by measuring the DL PRS and transmitted by the first terminal.

In some embodiments, the processor 2001 may further be configured to:

receive a positioning measurement and quality information of the positioning measurement obtained by measuring the SL PRS and transmitted by the first terminal.

In some embodiments, the quality information includes a signal-to-noise ratio (SNR), a signal-to-interference and noise ratio (SINR) or a variance of a measurement error.

The embodiments of the present disclosure may be provided as a method, system, or computer program product. Thus, the present disclosure may be in a form of complete hardware embodiment, complete software embodiment or software and hardware combined embodiment. Besides, the present disclosure may adopt a form of a computer program product implemented on one or more computer applicable storage media (including but not limited to a disk memory, a CD-ROM, an optical memory and the like) including a computer applicable program code.

The present disclosure is described with reference to flowcharts and/or block diagrams of the method, the device (system), and the computer program product according to the present disclosure. It is to be understood that each flow and/or block in the flowcharts and/or block diagrams as well as a combination of flows and/or blocks in the flowcharts and/or block diagrams may be implemented through computer program instructions. These computer program instructions may be provided for a processor of a general-purpose computer, a special-purpose computer, an embedded processor or another programmable data processing device to generate a machine, and an apparatus for implementing functions specified in one or more flows in the flowcharts and/or one or more blocks in the block diagrams is generated through instructions executed by the processor of the computer or another programmable data processing device.

These computer program instructions may also be stored in a computer-readable memory capable of guiding a computer or another programmable data processing device to work in a specific mode, and the instructions stored in the computer-readable memory generate a manufacture including an instruction apparatus, and the instruction apparatus implements the functions specified in one or more flows in the flowcharts and/or one or more blocks in the block diagrams.

These computer program instructions may also be loaded to a computer, another programmable data processing device, and a series of operating steps may be performed on the computer or another programmable device to produce a computer-implemented processing, and the instructions executed on the computer or the another programmable device provide steps for implementing the functions specified in one or more flows in the flowcharts and/or one or more blocks in the block diagrams.

Various modifications and variations to the present disclosure without departing from the embodiments of the present disclosure. In this case, if these modifications and variations of the present disclosure fall within the scope of the claims of the present disclosure and their equivalents, the present disclosure is also intended to include these modifications and variations.

We claim:

1. A method for positioning a terminal, applied to a terminal, comprising:

performing autonomous time adjustment (ATA) and/or autonomous frequency adjustment (AFA) according to notification signaling transmitted by a network-side device; wherein the notification signaling includes indication information for indicating the terminal to perform the ATA and/or AFA; and transmitting time information of the ATA and/or AFA performed by the terminal, wherein the time information of the ATA and/or AFA is used to determine a position of the terminal.

2. The method according to claim 1, wherein before performing the autonomous time adjustment (ATA) and/or autonomous frequency adjustment (AFA) according to the notification signaling transmitted by the network-side device, the method further comprises:

transmitting a report to the network-side device that the terminal supports performing the ATA and/or AFA within a valid adjustment window (VAW), and receiving the notification signaling transmitted by the network-side device; or transmitting a report to the network-side device that the terminal supports performing the ATA and/or AFA according to a predefined rule, and receiving the notification signaling transmitted by the network-side device.

3. The method according to claim 2, wherein the indication information included in the notification signaling includes a VAW configuration parameter; and performing the ATA and/or AFA according to the notification signaling transmitted by the network-side device comprises:

based on that a time range of a VAW indicated by the VAW configuration parameter does not coincide with a signal processing time range, performing the ATA and/or AFA within the time range of the VAW; wherein the signal processing time range refers to a time range of processing a positioning reference signal.

4. The method according to claim 3, wherein the indication information included in the notification signaling further includes a priority type parameter; the priority type parameter is used to indicate a priority relationship between the VAW and the positioning reference signal; and performing the ATA and/or AFA according to the notification signaling transmitted by the network-side device further comprises:

based on that the time range of the VAW indicated by the VAW configuration parameter coincides partially or completely with the signal processing time range, performing the ATA and/or AFA within the time range of the VAW according to the priority relationship between the VAW and the positioning reference signal.

5. The method according to claim 4, wherein performing the ATA and/or AFA within the time range of VAW according to the priority relationship between the VAW and a positioning reference signal comprises:

based on that a priority of the VAW is higher than a priority of the positioning reference signal, performing the ATA and/or AFA at a first moment, wherein the first moment is any moment within the time range of VAW; and based on that the priority of the VAW is lower than the priority of the positioning reference signal, performing the ATA and/or AFA at any moment within the time range of VAW except a second moment, wherein the second moment is a moment of processing the positioning reference signal by the terminal.

6. The method according to claim 2, wherein the indication information included in the notification signaling includes the predefined rule; the predefined rule indicates that the terminal does not to perform the ATA and/or AFA within a signal processing time range and performs the ATA and/or AFA after a positioning reference signal is processed; wherein the signal processing time range refers to a time range of processing the positioning reference signal.

7. The method according to claim 3, wherein the positioning reference signal is a downlink positioning reference signal (DL PRS), and the signal processing time range is a time range of a measurement gap (MG) or a downlink positioning reference signal processing window (PPW) determined according to a resource configuration parameter of the DL PRS transmitted by an LMF; processing the positioning reference signal refers to receiving the DL PRS transmitted by a base station and performing a measurement; or the positioning reference signal is an uplink sounding reference signal for positioning (UL SRS-Pos), and the signal processing time range is determined according to a resource configuration parameter of the UL SRS-Pos transmitted by the base station; processing the positioning reference signal refers to transmitting the UL SRS-Pos to the base station; or the positioning reference signal is a sidelink positioning reference signal (SL PRS), the terminal is a receiving terminal, the signal processing time range is determined according to an MG or the time range of the PPW indicated in a resource configuration parameter of the SL PRS transmitted by the LMF; processing the positioning reference signal refers to receiving the SL PRS transmitted by a transmitting terminal and performing a measurement; or the positioning reference signal is the SL PRS, the terminal is the transmitting terminal, and the signal processing time range is determined according to a resource configuration parameter of the SL PRS transmitted by the base station; and processing the positioning reference signal refers to transmitting the SL PRS to the receiving terminal.

8. The method according to claim 1, wherein the notification signaling is long-term-evolution positioning protocol (LPP) signaling transmitted by a location management function (LMF); or the notification signaling is radio resource control (RRC) signaling, media access control-control element (MAC CE) signaling or downlink control information (DCI) signaling transmitted by a base station.

9. A method for positioning a terminal, applied to a base station, comprising:

receiving a terminal capability report transmitted by a first terminal; wherein the terminal capability report represents that the first terminal supports performing ATA and/or AFA within a VAW or supports performing the ATA and/or AFA according to a predefined rule; and transmitting notification signaling; wherein the notification signaling is used to indicate the first terminal to perform the ATA and/or AFA.

10. The method according to claim 9, wherein the notification signaling includes a VAW configuration parameter and a priority type parameter; the priority type parameter is used to indicate a priority relationship between the VAW and a DL PRS; or the notification signaling includes the predefined rule, the predefined rule indicates that the first terminal does not perform the ATA and/or AFA within a signal processing time range and performs the ATA and/or AFA after a positioning reference signal is processed; wherein the positioning reference signal is a DL PRS, a UL SRS-Pos or an SL PRS, and the signal processing time range refers to a time range of processing the positioning reference signal.

11. The method according to claim 9, wherein the base station comprises a serving base station and a neighbor base station.

12. The method according to claim 9, wherein the notification signaling is RRC signaling, MAC CE signaling or DCI signaling.

13. A terminal, comprising: a memory, a transceiver and a processor;

wherein the memory is configured to store computer instructions;

the transceiver is configured to transceive data under control of the processor; and the processor is configured to read a computer program in the memory and perform:

performing ATA and/or AFA according to notification signaling transmitted by a network-side device; wherein the notification signaling includes indication information for indicating the terminal to perform the ATA and/or AFA; and controlling the transceiver to transmit time information of the ATA and/or AFA performed by the terminal; wherein the time information of the ATA and/or AFA is used to determine a position of the terminal.

14. The terminal according to claim 13, wherein the transceiver is further configured to:

transmit a report to the network-side device that the terminal supports performing the ATA and/or AFA within a VAW, and receive the notification signaling transmitted by the network-side device; or transmit a report to the network-side device that the terminal supports performing the ATA and/or AFA according to a predefined rule, and receive the notification signaling transmitted by the network-side device.

15. The terminal according to claim 14, wherein the indication information included in the notification signaling includes a VAW configuration parameter; and the processor is configured to:

based on that the time range of a VAW indicated by the VAW configuration parameter does not coincide with a signal processing time range, perform the ATA and/or AFA within a time range of the VAW; wherein the signal processing time range refers to a time range of processing a positioning reference signal.

16. The terminal according to claim 15, wherein the indication information included in the notification signaling further includes a priority type parameter; the priority type parameter is used to indicate a priority relationship between the VAW and the positioning reference signal; and the processor is further configured to:

perform the ATA and/or AFA within the time range of VAW according to the priority relationship between the VAW and the positioning reference signal based on that the time range of the VAW indicated by the VAW configuration parameter coincides partially or completely with the signal processing time range.

17. The terminal according to claim 16, wherein the processor is configured to:

perform the ATA and/or AFA at a first moment based on that a priority of the VAW is higher than a priority of the positioning reference signal, wherein the first moment is any moment within the time range of VAW; and perform the ATA and/or AFA at any moment within the time range of VAW except a second moment based on that the priority of the VAW is lower than the priority of the positioning reference signal, wherein the second moment is a moment of processing the positioning reference signal by the terminal.

18. The terminal according to claim 14, wherein the indication information included in the notification signaling includes the predefined rule; the predefined rule indicates that the terminal does not to perform the ATA and/or AFA within a signal processing time range and performs the ATA and/or AFA after the positioning reference signal is processed; wherein the signal processing time range refers to a time range of processing the positioning reference signal.

19. The terminal according to claim 15, wherein the positioning reference signal is a DL PRS, and the signal processing time range is a time range of an MG or a PPW determined according to a resource configuration parameter of the DL PRS transmitted by an LMF; processing the positioning reference signal refers to receiving the DL PRS transmitted by a base station and performing a measurement; or the positioning reference signal is a UL SRS-Pos, and the signal processing time range is determined according to a resource configuration parameter of the UL SRS-Pos transmitted by the base station; processing the positioning reference signal refers to transmitting the UL SRS-Pos to the base station; or the positioning reference signal is an SL PRS, the terminal is a receiving terminal, and the signal processing time range is determined according to a time range of an MG or a PPW indicated in a resource configuration parameter of the SL PRS transmitted by the LMF; processing the positioning reference signal refers to receiving the SL PRS transmitted by a transmitting terminal and performing a measurement; or the positioning reference signal is the SL PRS, the terminal is the transmitting terminal, and the signal processing time range is determined according to a resource configuration parameter of the SL PRS transmitted by the base station; and processing the positioning reference signal refers to transmitting the SL PRS to the receiving terminal.

20. A base station, comprising: a memory, a transceiver and a processor, wherein the memory is configured to store computer instructions;

the transceiver is configured to perform method for positioning a terminal according to claim 9 under control of the processor.

* * * * *